United States Patent
Pattan et al.

(10) Patent No.: US 9,749,820 B2
(45) Date of Patent: Aug. 29, 2017

(54) METHOD AND SYSTEM FOR IDENTITY MANAGEMENT ACROSS MULTIPLE PLANES

(71) Applicant: Samsung Electronics Co., Ltd, Gyeonggi-do (KR)

(72) Inventors: Basavaraj Jayawant Pattan, Bangalore (IN); Rajavelsamy Rajadurai, Bangalore (IN); Ho-Yeon Lee, Gyeonggi-do (KR); Song-Yean Cho, Seoul (KR); Suresh Chitturi, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/225,758

(22) Filed: Aug. 1, 2016

(65) Prior Publication Data
US 2017/0041768 A1 Feb. 9, 2017

(30) Foreign Application Priority Data

Jul. 31, 2015 (IN) .......................... 3985/CHE/2015
Aug. 3, 2015 (IN) .......................... 4030/CHE/2015
Jul. 27, 2016 (IN) .......................... 3985/CHE/2015

(51) Int. Cl.
*H04W 4/10* (2009.01)
*H04L 29/12* (2006.01)

(52) U.S. Cl.
CPC ............. *H04W 4/10* (2013.01); *H04L 61/103* (2013.01); *H04L 61/1529* (2013.01); *H04L 61/1588* (2013.01); *H04L 61/2069* (2013.01)

(58) Field of Classification Search
CPC ..... H04W 4/10; H04W 76/005; H04W 76/02; H04W 84/042; H04W 28/0263;
(Continued)

(56) References Cited

U.S. PATENT DOCUMENTS

2006/0031294 A1* 2/2006 Poikselka ........... H04W 76/005
709/204

FOREIGN PATENT DOCUMENTS

CN 104618349 5/2015
WO 2015050395 A1 4/2015

OTHER PUBLICATIONS

International Search Report dated Oct. 31, 2016 in connection with International Application No. PCT/KR2016/008415, 4 pages.
(Continued)

*Primary Examiner* — Keith Ferguson

(57) ABSTRACT

Embodiments herein provide a method for identity management across multiple planes. The method includes receiving, by a MCPTT server, a first request message to establish a call between a first MCPTT client and the one or more second MCPTT client from a signaling plane entity. The first request message includes an application plane identity of the one or more second MCPTT client. Further, the method includes translating, at the MCPTT server, the application plane identity of the one or more second MCPTT client to a signaling plane identity of the one or more second MCPTT client. Furthermore, the method includes sending, by the MCPTT server, the one or more second request message including the signaling plane identity of the one or more second MCPTT client to the second MCPTT client for establishing the call via the signaling plane entity.

20 Claims, 24 Drawing Sheets

600

Receive a first request message to establish a call between a first MCPTT client and one or more second MCPTT client from a signaling plane entity — 602

Translate the application plane identity of the at least one second MCPTT client to a signaling plane identity of the at least one second MCPTT client — 604

Send one or more second request message including the signaling plane identity of the one or more second MCPTT client to establish the call to the signaling plane entity — 606

(58) Field of Classification Search
CPC ..... H04W 28/10; H04W 4/12; H04W 40/246; H04W 76/021; H04W 76/025; H04W 72/042
USPC ....... 455/518, 519, 445, 500, 517, 450, 509, 455/507, 550.1, 426.2, 42, 2.1, 403, 410, 455/411, 514, 414.1–414.4, 416; 370/252, 261, 392, 328, 338, 356, 395.2, 370/260, 262
See application file for complete search history.

(56) References Cited

OTHER PUBLICATIONS

Written Opinion of the International Searching Authority dated Oct. 31, 2016 in connection with International Application No. PCT/KR2016/008415, 6 pages.
Samsung, "Supporting Floor Control for MCPPT on Network", 3GPP TSG-SA WG6 Meeting #2, S6-150141, Sophia Antipolis, France, Feb. 25-27, 2015, 4 pages.
Huawei, et al., "Group Call Setup for MCPTT User in on Network Use", 3GPP TSG-SA WG6 Meeting #2, S6-150163, Sophia Antipolis, France, Feb. 25-27, 2015, 5 pages.
3GPP TR 23.779 V1.0.0, "3rd Generation Partnership Project; Technical Specification Group Services and System Aspects; Study on Application Architecture to Support Missing Critical Push to Talk over LTE (MCPTT) Services, (Release 13)", Jun. 2015, 248 pages.

* cited by examiner

METHOD AND SYSTEM FOR IDENTITY MANAGEMENT ACROSS MULTIPLE PLANES

CROSS-REFERENCE TO RELATED APPLICATION(S) AND CLAIM OF PRIORITY

The present application is related to and claims the benefit under 35 U.S.C. §119(a) of Indian Provisional Application Numbers 3985/CHE/2015 filed on Jul. 31, 2015, 4030/CHE/2015 filed on Aug. 3, 2015, and an Indian Non-Provisional Application Number 3985/CHE/2015 filed on Jul. 27, 2016 at in the Indian Intellectual Property Office, the entire disclosure of each of which is incorporated herein by reference.

TECHNICAL FIELD

The subject matter of the present disclosure relates to a wireless communication and more particularly to a mechanism for identity management across multiple planes.

BACKGROUND

Mission Critical Communications for public safety is of significant interest and considered very important in a telecom standardization industry, a national regulatory agency, a telecom service provider, a network vendor, a device manufacturer or the like. With the growing interest within the public safety and critical communications community of securing Long-Term Evolution (LTE) as the next-generation platform for the public safety communications, over traditional narrowband technologies such as Project 25 (P25) and Terrestrial Trunked Radio (TETRA) systems, Third Generation Partnership Project (3GPP) has established a new work-item Mission Critical Push To Talk (MCPTT) for Release 13. The main objective of this work in the 3GPP is to create single common standard that meets the needs of all critical communications users globally.

While Public Safety over LTE (PS-LTE) standards are already in development within the 3GPP with initiatives such as Proximity Services (ProSe) and Group Communication Services Enabler (GCSE). Since the 3GPP Release 12, the MCPTT is responsible for developing the overall application and service layer aspects of mission critical applications. It is however, expected that the MCPTT utilizes the underlying technologies such as ProSe and GCSE as necessary in order to realize the MCPTT requirements.

In order to support multiple deployment models for a MCPTT application, the management of application plane and signaling plane are handled by different organizations, it is envisioned that there will be two or more distinct identities i.e., some at the application plane and the others at the signaling plane. In other words, each plane or domain defines their own identities.

There are significant efforts in considering Internet Protocol (IP) Multimedia Subsystem (IMS) based Architecture (i.e., Session Initiation Protocol (SIP) core) for the MCPTT applications. However, for the MCPTT service, it may be required to use its own identity separate from mobile/service subscriber identities assigned by the IMS/LTE (e.g., Public Land Mobile Network (PLMN)) operator. This is due to the following MCPTT requirements.

The MCPTT service supports the MCPTT user with globally unique identities, independent of the International Mobile Subscriber Identity (IMSI) assigned by a 3GPP network operator to the UEs. The MCPTT identities shall be part of the MCPTT application service domain. The MCPTT identities shall form the basis of the MCPTT application layer security for the MCPTT service.

When the MCPTT UE is powered on, it accesses the LTE system, and connects to an Evolved Packet Core (EPC). During this phase, the credentials from a Universal Subscriber Identity Module (USIM) application (or possibly, the ISIM application, if the IMS is used) on a Universal Integrated Circuit Card (UICC) associated with the MCPTT UE is used for authentication with a Home Subscriber Server (HSS). This is followed by the MCPTT application, resident on the MCPTT UE, establishing a connection, employing MCPTT application layer security in its connection to the MCPTT service.

Further, in some scenarios when the MCPTT service provider and IMS operator are independent, it is required to have MCPTT user identity and mission critical organization confidentiality i.e., MCPTT ID hiding maintained between the MCPTT service provider and the IMS operator, due to the following MCPTT requirement. The MCPTT service shall support confidentiality of the identity of the Mission Critical Organization.

The MCPTT also has requirements for sharing UE from a pool of UEs i.e., each UE being interchangeable with any other, and users randomly choosing one or more UEs from the pool. Based on the MCPTT requirements and scenarios, it is required to establish, store and utilize the relationship between the MCPTT identities and the identities assigned by an IMS (SIP Core) operator for seamless operation of MCPTT service over IMS (SIP Core).

Thus, it is desired to address the above mentioned shortcomings or at least provide a useful alternative.

The principal object of the embodiments herein is to provide a method and system for identity management across multiple planes.

Another object of the embodiments herein is to provide a method and system for receiving, by a MCPTT server, a first request message to establish a call between a first MCPTT client and a second MCPTT client from a signaling plane entity.

Another object of the embodiments herein is to provide a method and system for translating, at the MCPTT server, the application plane identity of the second MCPTT client to a signaling plane identity of the second MCPTT client.

Another object of the embodiments herein is to provide a method and system for sending, by the MCPTT server, one or more second request messages including the signaling plane identity of the one or more second MCPTT clients to establish the call to the signaling plane entity.

Another object of the embodiments herein is to provide a method and system for encrypting an application plane identity of a first MCPTT client and an application plane identity of one or more second MCPTT clients in a first request message sent by the first MCPTT client.

Another object of the embodiments herein is to provide a method and system for decrypting an application plane identity of a first MCPTT client and an application plane identity of one or more second MCPTT clients.

Another object of the embodiments herein is to provide a method and system for encrypting a signaling plane identity of one or more second MCPTT clients in a request message sent by the MCPTT server.

SUMMARY

To address the above-discussed deficiencies, it is a primary object to provide a method for identity management across multiple planes. The method includes receiving, by a MCPTT server, a first request message to establish a call between a first MCPTT client and one or more second MCPTT clients from a signaling plane entity. The first request message includes an application plane identity of the first MCPTT client and an application plane identity of the one or more second MCPTT clients. Further, the method includes translating, at the MCPTT server, the application plane identity of the one or more second MCPTT clients to a signaling plane identity of the one or more second MCPTT clients. Furthermore, the method includes sending, by the MCPTT server, one or more second request messages including the signaling plane identity of the one or more second MCPTT clients to the second MCPTT client to establish the call via the signaling plane entity.

In an embodiment, translating the application plane identity of the one or more second MCPTT clients to the signaling plane identity of the one or more second MCPTT clients includes identifying the signaling plane identity of the one or more second MCPTT clients from the identity management entity.

In an embodiment, translating the application plane identity of the second MCPTT client to the signaling plane identity of the second MCPTT client includes retrieving a MCPTT client identity for each of the second MCPTT clients associated with the application plane identity and identifying the signaling plane identity corresponding to each of the second MCPTT identity from an identity management entity.

In an embodiment, the signaling plane identity of the one or more second MCPTT clients is predefined and is stored in the identity management entity during service registration.

In an embodiment, the identity management entity is stored at one of the MCPTT server, a group management server, and a signaling plane domain entity.

In an embodiment, the application plane identity is one of a MCPTT client identity and a MCPTTT group identity.

In an embodiment, the signaling plane identity is a public user identity.

In an embodiment, the signaling plane identity is an IP Multimedia Public Identity (IMPU).

In an embodiment, the signaling plane identity is a tel Uniform Resource Identifier (tel URI).

In an embodiment, the signaling plane identity is a Mobile Subscriber Integrated Services Digital Network (MSISDN) identity.

In an embodiment, the signaling plane entity is one of a Session Initiation Protocol (SIP) core signaling plane entity, IMS core signaling plane entity, and a HSS entity.

In an embodiment, the application plane identity of the first MCPTT client and the application plane identity of the one or more second MCPTT clients in the first request message is encrypted by the first MCPTT client.

In an embodiment, the MCPTT server decrypts the application plane identity of the first MCPTT client and the application plane identity of the one or more second MCPTT clients by fetching a security key associated with the first MCPTT client.

In an embodiment, the application plane identity of the one or more second MCPTT clients in the one or more second request messages is encrypted by the MCPTT server, wherein the MCPTT server sends the encrypted application plane identities to the first MCPTT client.

Accordingly the embodiments herein disclose a method for identity management across multiple planes. The method includes receiving, by a signaling plane entity, a first request message from a first MCPTT client to establish a call with one or more second MCPTT clients. The first request message includes an application plane identity of the one or more second MCPTT clients. Further, the method includes sending, by the signaling plane entity, the first request message to the MCPTT server. Furthermore, the method includes receiving, by the signaling plane entity, one or more second request messages from the MCPTT server to establish the call to the one or more second MCPTT clients. One or more second request messages includes one or more signaling plane identity of the one or more second MCPTT clients.

Accordingly the embodiments herein disclose a MCPTT server for identity management across multiple planes. The MCPTT server includes a processor unit coupled to a memory unit. The processor unit is configured to receive a first request message to establish a call between a first MCPTT client and one or more second MCPTT client from a signaling plane entity. The first request message includes an application plane identity of one or more second MCPTT client. The processor unit is further configured to translate the application plane identity of the one or more second MCPTT client to a signaling plane identity of one or more second MCPTT client. The processor unit is further configured to send one or more second request message including the signaling plane identity of one or more second MCPTT client to establish the call to the signaling plane entity.

Accordingly the embodiments herein disclose a signaling plane entity for identity management across multiple planes. The signaling plane entity includes a processor unit coupled to a memory unit. The processor unit is configured to receive a first request message from a first MCPTT client to establish a call with one or more second MCPTT client. The first request message includes an application plane identity of the one or more second MCPTT client. The processor unit is further configured to send the first request message to the MCPTT server. The processor unit is further configured to receive one or more second request message from the MCPTT server. The second request message includes at least one signaling plane identity of one or more second MCPTT client. The processor unit is further configured to establish the call with the one or more second MCPTT client based on the signaling plane identity.

Accordingly the embodiments herein disclose a system for identity management across multiple planes. The system includes a signaling plane entity configured to receive a first request message from a first MCPTT client to establish a call with one or more second MCPTT client. The first request message includes an application plane identity of the one or more second MCPTT client. The signaling plane entity is configured to send the first request message. A MCPTT server is configured to receive the first request message from the signaling plane entity. The MCPTT server is further configured to translate the application plane identity of the one or more second MCPTT client to a signaling plane identity of the one or more second MCPTT client. The MCPTT server is further configured to send one or more second request message including the signaling plane identity of the one or more second MCPTT client to establish the call to the signaling plane entity. The signaling plane entity is configured to receive the one or more second request message from the MCPTT server. The signaling plane entity is configured to establish the call with the one or more second MCPTT client based on the signaling plane identity.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
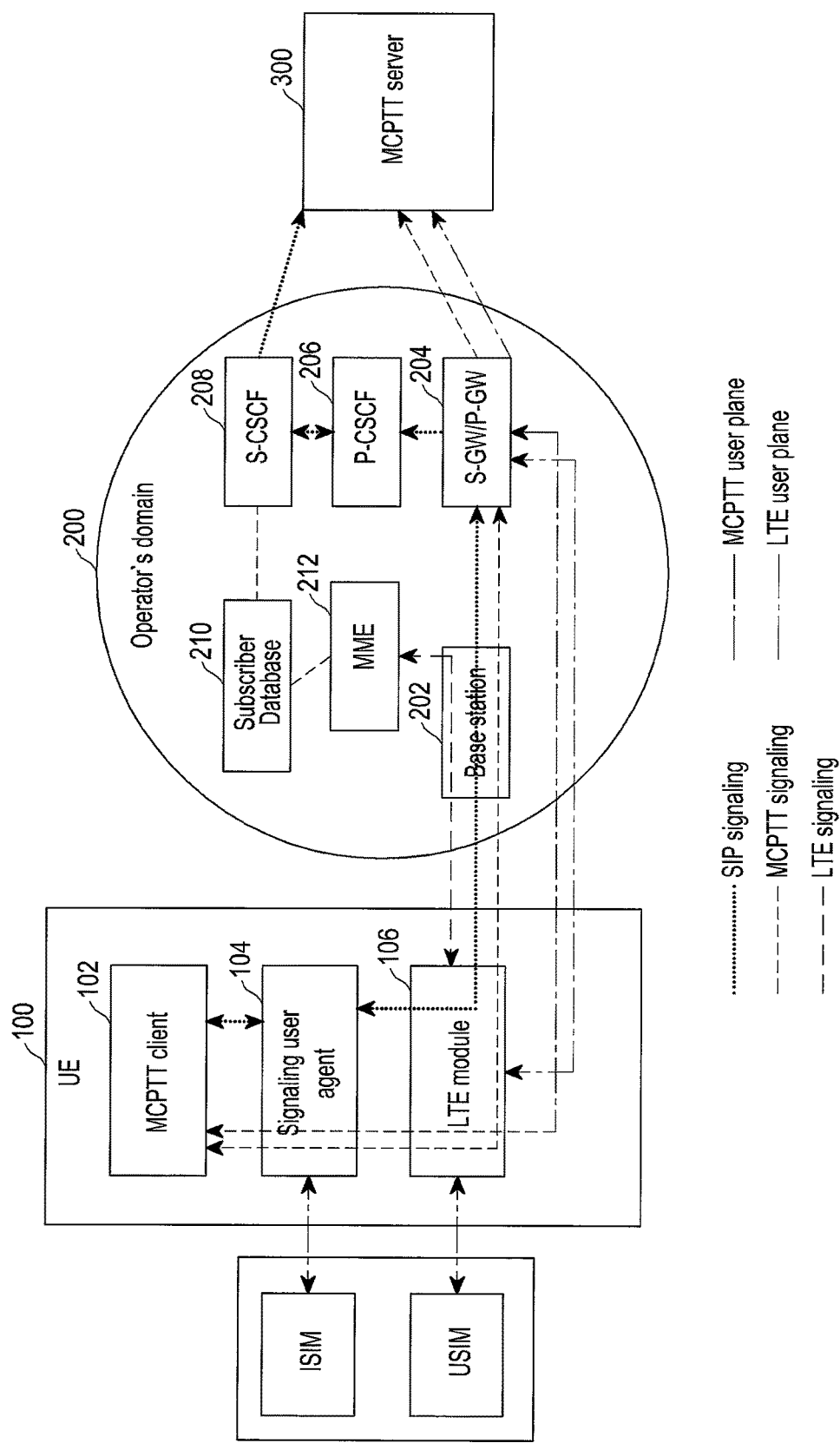
FIG. 1 is an overview of a MCPTT system, according to embodiments as disclosed herein.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Throughout the description, the terms "IMS" and "SIP Core" are used interchangeably.

The embodiments herein achieve a method for identity management across multiple planes. The method includes receiving, by a MCPTT server, a first request message to establish a call between a first MCPTT client and one or more second MCPTT client from a signaling plane entity. The first request message includes an application plane identity of one or more second MCPTT client. Further, the method includes translating, at the MCPTT server, the application plane identity of one or more second MCPTT client to a signaling plane identity of one or more second MCPTT client. Furthermore, the method includes sending, by the MCPTT server, one or more second request message including the signaling plane identity of one or more second MCPTT client to establish the call to the signaling plane entity.

The proposed method can be used to perform an identity mapping and translation across multiple planes within a single service. The proposed method can be used to provide a mechanism by which, registration and non-registration procedures are supported with the concept of multiple identities between the users of the MCPTT system and as well as a logical location to store the mapping information.

The proposed method can be used to provides a mechanism to hide the application level identity (i.e., encrypt the identity) from the signaling plane. The proposed method can be used to identify the security association in the MCPTT domain, other than the same domain identities (can be lower layer identity or same layer identity), since the identities are encrypted when received. This process is achieved using by mapping of other domain identity (i.e., signaling domain identity) to the Security Association (SA) at the application domain.

In an embodiment, the identity binding of the IMPU and the MCPTT ID is used to uniquely identify the encryption key used for encryption of the application layer identities.

Referring now to the drawing and more particularly to FIGS. 1 through 19, where similar reference characters denote corresponding features consistently throughout the figure, there are shown preferred embodiments.

FIG. 1 is an overview of a MCPTT system, according to the embodiments as disclosed herein. The MCPTT system includes a UE 100, an operator domain 200, and a MCPTT server 300. The MCPTT system defines a concept of shareable UEs 100. In an embodiment, the shareable MCPTT UE 100 can be considered as a pool of UEs, where each UE being interchangeable with any other MCPTT responders/users (Public Safety (PS) agent), and MCPTT users/responders/PS agent randomly choosing one or more MCPTT capable UEs 100 from the pool. In an embodiment, the shareable MCPTT UE 100 can be used by the user who can gain access to the MCPTT client 102 stored on the UE 100 and can become an authenticated MCPTT user.

Further, the UE 100 includes a MCPTT client 102, a signaling user agent 104, and a LTE module 106. The operator domain 200 includes a base station 202, a primary gateway/secondary gateway 204, a Proxy-Call Session Control Function (P-CSCF) 206, a Serving CSCF (208), a subscriber database 210, and a Mobility Management Entity (MME) 212.

The MCPTT system utilizes aspects of a IMS architecture defined in the 3GPP TS 23.228 standard, a ProSe architecture defined in the 3GPP TS 23.303 standard, a Group Communication System Enablers for LTE (GCSE_LTE) architecture defined in 3GPP TS 23.468 standard and a Packet Switched (PS)-Packet Switched (PS) access transfer procedures defined in the 3GPP TS 23.237 standard to enable support of the MCPTT service. The UE 100 primarily obtains access to the MCPTT service via an Evolved Universal Terrestrial Radio Access (E-UTRAN), using the EPS architecture defined in the 3GPP TS 23.401 standard. Certain MCPTT functions such as dispatch and administrative functions can be supported using either MCPTT UEs in the E-UTRAN or using MCPTT UEs via non-3GPP access networks (e.g., WLAN access networks).

Further, in the MCPTT system, a signaling plane will be operated based on IMS reference points. The signaling plane provides the necessary signaling support to establish the association of users of the UE's 100 involved in the MCPTT call or other type of services. The signaling plane also offers service access and control the operation of the services. The signaling control plane uses the services of a bearer plane. When the application and signaling planes carry different identities, there is a need to translate the identities between the two planes and maintain a mapping between them. The application plane provides all of the services (e.g. call control, floor control or the like) required by the user together with the necessary functions to support media control and transfer. It uses the services of the signaling plane to support those requirements. The application plane also provides for the conferencing of media, transcoding of the media, and provision of tones and announcements.

There are various types of mapping information scenarios that needs to be established and considered while designing the solution architecture, based on the user-device relationships, for example, one to one user device relationship, one-to-many user device relationship, or many to one user device relationship. Further, it is necessary to define the method how the registration and non-registration procedures are supported with the concept of multiple identities e.g. private call, group call between multiple users of the MCPTT system, and as well as the logical location to store the mapping information so it is conveniently accessible to functional entities of the MCPTT system that require such mapping information.

The MCPTT service supports communication between multiple users (i.e. group call), where each user has the ability to gain access to the permission to talk in an arbitrated manner. The MCPTT service also supports private calls between two users.

Further, the MCPTT system includes signaling plane entities and the MCPTT server 300. The signaling plane entities can be, for example but not limited to, a SIP core signaling plane entities (e.g., P-CSCF 206 and S-CSCF 208), the IMS core signaling plane entities, and a HSS entity (e.g., subscriber database 210). The signaling plane entity is configured to receive a first request message to establish a call between a first MCPTT client and one or more second MCPTT clients through the MCPTT server 300. The first request message includes the application plane identity of the one or more second MCPTT clients. The application plane identity can be, for example but not limited to, a MCPTT client identity and a MCPTT group identity. The MCPTT server 300 is configured to receive the first request message from the signaling plane entity and translate the application plane identity of the one or more second MCPTT clients to a signaling plane identity of the one or more second MCPTT clients. The signaling plane identity can be a public user identity. In an embodiment, the signaling plane identity of the one or more second MCPTT clients is predefined and is stored in an identity management entity during service registration (i.e., SIP registration). The identity management entity is stored at one of the MCPTT server 300, a group management server, and a signaling plane domain entity.

In an embodiment, the application plane identity of the one or more second MCPTT clients to the signaling plane identity of the one or more second MCPTT clients is translated by identifying the signaling plane identity of the one or more second MCPTT clients from the identity management entity.

In an embodiment, the application plane identity of the one or more second MCPTT clients to the signaling plane identity of the one or more second MCPTT clients is translated by retrieving the MCPTT client identity for each of the second MCPTT client associated with the application plane identity, and identifying the signaling plane identity corresponding to each of the second MCPTT identity from the identity management entity.

Based on translating the application plane identity of the one or more second MCPTT clients to the signaling plane identity of the one or more second MCPTT client, the MCPTT server 300 is configured to send one or more second request message including the signaling plane identity of the one or more second MCPTT client to establish the call to the signaling plane entity.

Further, in an embodiment, the application plane identity of the first MCPTT client and the application plane identity of the one or more second MCPTT client in the first request message is encrypted by the first MCPTT client.

In an embodiment, the MCPTT server 300 decrypts the application plane identity of the first MCPTT client and the application plane identity of the one or more second MCPTT client by fetching an security key associated with the first MCPTT client.

In an embodiment, the application plane identity of the one or more second MCPTT client in the one or more second request message is encrypted by the MCPTT server 300. Further, the MCPTT server 300 sends the encrypted application plane identities to the first MCPTT client. The MCPTT server 300 is configured to fetch the security key associated with the second MCPTT client for the encryption process.

The FIG. 1 shows the limited overview of the MCPTT system but, it is to be understood that other embodiments are not limited thereto. Further, the MCPTT system includes any number of hardware or software components communicating with each other.

Figure 2:
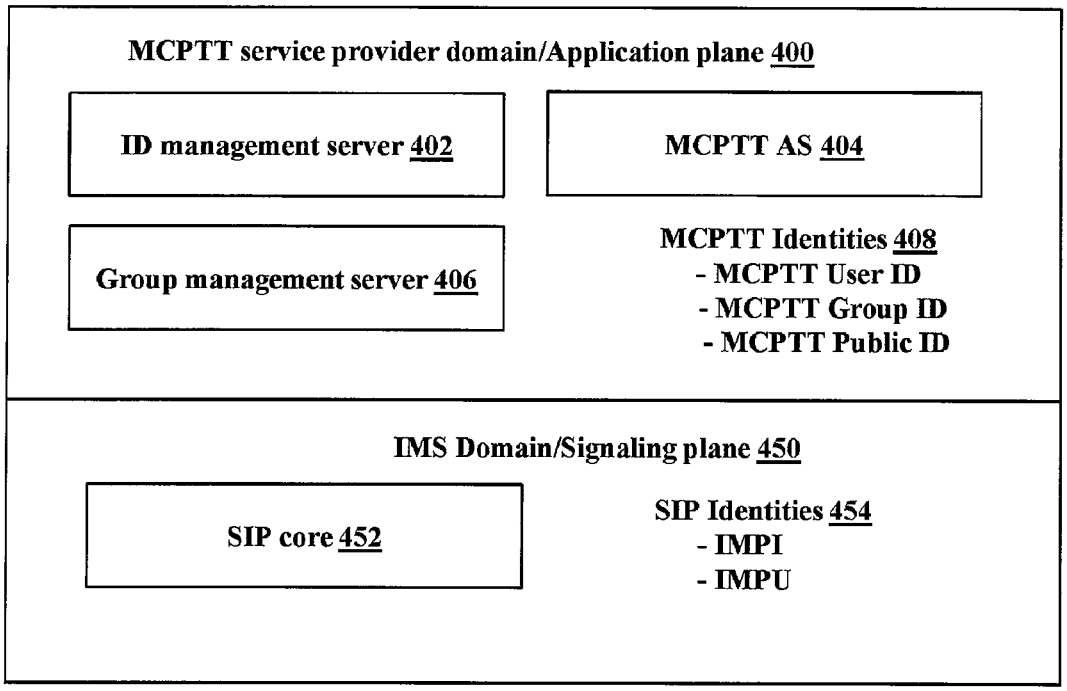
FIG. 2 illustrates a MCPTT functional model for a network, according to embodiments as disclosed herein.

FIG. 2 illustrates a MCPTT functional model for a network, according to the embodiments as disclosed herein. The MCPTT functional model is operated between the MCPTT service provider domain/application plane 400 and the IMS Domain/signaling plane 450. The MCPTT service provider domain/application plane 400 includes an ID management server 402, a MCPTT AS 404, a group management server 406, and MCPTT Identities 408. The IMS Domain/signaling plane 450 includes a SIP core 452 and SIP Identities 454. The functional models in the MCPTT system may be involved to realize the mapping between different identities. Unlike conventional mechanisms, every message that crosses the border between application and signaling plane requires an identity translation operation such that each of the planes is able to address the user with their own plane identity while meeting the requirements of separated identities between the different planes.

Figure 3:
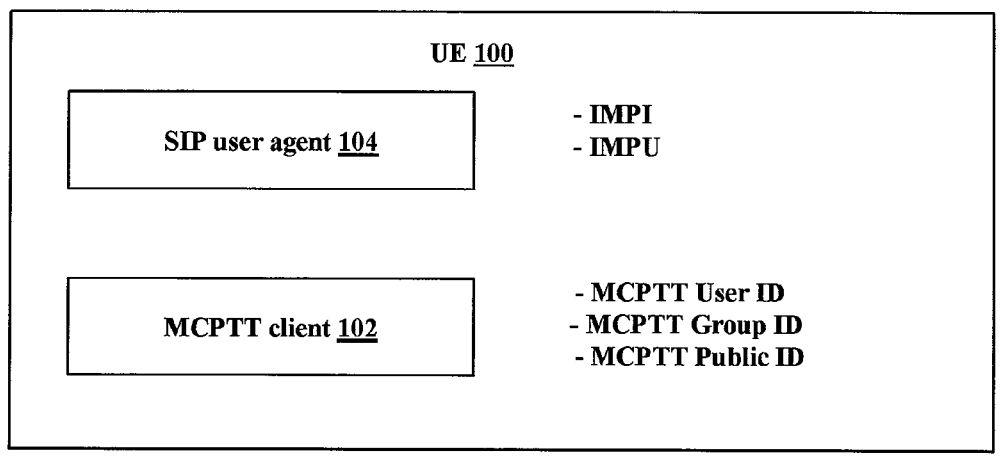
FIG. 3 illustrates a MCPTT functional model for a UE, according to embodiments as disclosed herein.

FIG. 3 illustrates a MCPTT functional model for the UE 100, according to the embodiments as disclosed herein. The UE 100 includes a SIP user agent 104 and the MCPTT client 102. Further, the MCPTT functional model in the MCPTT system includes a MCPTT user identity and a public user identity. The MCPTT user identity uniquely identifies a MCPTT user and related user profile at the MCPTT AS 404 or the application plane. The MCPTT user identity also known as a MCPTT ID. The public user identity is also called as IP Multimedia Public Identity (IMPU) in an IMS domain 450. It is associated with a profile at the signaling control plane layer. All signaling messages between the MCPTT user agent and the MCPTT server 300 utilize the public user identity as the identifier to enable signaling messages to be routed through the MCPTT system. This identity fulfills the same functions as the public user identity defined the in 3GPP TS 23.228 standard.

The following relationships exist between the MCPTT user identity and the public user identities:

In an embodiment, the user identified by an MCPTT user identity can access MCPTT AS 404 services from the MCPTT client 102 identified by the public user identity.

In an embodiment, a single MCPTT user identity may have more than one public user identity (to support multiple UEs).

In an embodiment, the MCPTT ID may be mapped to one or more public user identities (e.g. multiple UEs, shared UE).

In an embodiment, the public user identity may be mapped to one or more MCPTT IDs (e.g. UE-to-network relay).

In an embodiment, the MCPTT ID may be mapped to one or more public Globally Routable User Agent URIs (GRUUs) (e.g. a user logging on from multiple UEs, multiple users sharing the same UE).

In an embodiment, the multiple MCPTT user identities may be mapped to a single public user identity (to support shared UEs).

The following table describes the relationship between application plane identity i.e. MCPTT ID, and signaling plane identity i.e. IMPU.

TABLE 1

| MCPTT ID | Signaling Plane ID | Active/Default Flag |
|---|---|---|
| ID-1 (User 1) | IMPU-1A (Device #1) | X |
|  | IMPU-1B (Device #2) |  |
| ID-2 (User 2) | IMPU-2A (Device #1) | X |
| ID-3 (User 3) | IMPU-3B (Device #1) | X |

IMPU-1A means, IMPU of User 1's Device #1
IMPU-1B means, IMPU of User 1's Device #2
ID-1A means, MCPTT ID of User1

The Table 1 also illustrates the one-to-one user device relationship, one-to-many user device relationship, and many-to-one user device relationship.

This relationship between the MCPTT user identity and the public user identity may be maintained in the MCPTT application domain. The MCPTT application domain can be, for example but not limited to, the MCPTT server 300, an identity management entity, or other type of independent functional entity. This relationship between the MCPTT user identity and the public user identity is easily accessible to other application domain functions such as Group management Server and MCPTT server or in the IMS operator domain (e.g., IMS core, HSS or other entity in the signaling plane) depending on where the identity translation is performed.

In an embodiment, the MCPTT server 300 is configured to manage the mapping between the MCPTT IDs and the public user identities.

In an embodiment, the MCPTT server 300 is configured to manage the mapping between MCPTT IDs and public GRUUs.

In an embodiment, the temporary GRUUs are mapped to the public GRUUs by the SIP core 542.

If the identity translation is performed by the MCPTT application domain then the relationship between the MCPTT user identity and the public user identity can be stored in the application domain entities like MCPTT server 300, identity management entity, the other common functional entity that is easily accessible to other application domain functions such as group management server and the MCPTT server. Further, if the identities relationship is stored outside of the MCPTT server 300 then the MCPTT server 300 is responsible for handling the MCPTT service requests. The MCPTT service request have access to the relationship between the identities for address translation or the entity storing the identities relationship provides the address identity translation to the MCPTT server 300.

If the identity translation is performed by the IMS signaling plane domain then the relationship between the MCPTT user identity and the public user identity can be stored in the signaling plane domain entities like IMS core, HSS or the like. Further if the identities relationship is stored outside of the IMS core then the IMS core has access to the relationship between the identities for address translation or the entity storing the identities relationship provides the identity translation to the IMS core.

When the MCPTT service provider and the home network operator are part of the same organization, the public user identity at the signaling plane identifies the MCPTT user at the application plane. In such case there is no need for address translation.

In an embodiment, when the MCPTT service provider and the home PLMN operator are part of the same trust domain, the public user identity in the SIP signaling control plane may also identify the MCPTT user at the application plane.

In an embodiment, when the MCPTT service provider and the home PLMN operator are part of the same trust domain, the public service identity in the SIP signaling control plane may also identify the MCPTT group ID at the application plane.

Identity translation in the non-shared UE scenario:

Registration request: The UE 100 generates SIP REGISTER request for the MCPTT service registration. The information about the MCPTT identity of the user is included in the SIP from a header of a SIP REGISTER request and is used for service registration and authentication at the MCPTT server 300. The other values of SIP headers except from header are same as normal SIP (IMS) procedure. The SIP core 542 (e.g., IMS domain, or the like) name, the IMPU of the user, the IP address of the UE 100 are included in request URI, to header and contact header, respectively. ICSI for a MCPTT service is also carried in the contact header. After receiving SIP REGISTER request and subsequent to successful registration with both SIP core 452 and the MCPTT service provider, the relationship information between the MCPTT user identity and the signaling plane public user identity of user is stored at the application domain and/or the signaling domain.

Non-registration request (single MCPTT system 1-1 requests): Entity (originating or terminating UE 100 or the MCPTT server 300) that populates a non-registration request (e.g., SIP INVITE, SIP BYE) for 1-1 requests will include the headers as below:

Request URI: MCPTT user identity of target user or public user identity of target user depending on the scenario From header: MCPTT user identity of originator (or can be anything when MCPTT ID is carried in body)

To header: MCPTT user identity of target user (or can be anything when MCPTT ID is carried in body)

P-preferred-identity header: public user identity of originator

Contact: IP address of MCPTT originator UE

P-preferred-service header: MCPTT service identifier

At the MCPTT application domain, the entity populating non-registration request can include only the MCPTT user identity of the target user in the request URI, since the MCPTT application domain is not aware of the public user identity for the target user. Upon receiving the request at the IMS operator domain, it uses the MCPTT service identifier to route the request to the MCPTT server 300. The public user identity is the one which is normally required at the IMS operator domain for routing purposes i.e., for handling the request and routing the request towards the target user who is identifiable in the MCPTT application domain. The MCPTT server 300 then obtains the public user identity corresponding to the MCPTT user identity of the target user from the stored relationship information between MCPTT user identities and signaling plane public user identity of the user and replaces the MCPTT user identity of the target user with the public user identity of target user. Then the remaining steps to deliver the non-registration request to the target MCPTT user is as normal as 3GPP procedures.

Non-registration request (group requests): Entity (originating or terminating UE or MCPTT server) that populates a non-registration request (e.g., SIP INVITE, SIP BYE) for group requests will include the headers as below:

Request URI: The public service identifier (pre-configured in the MCPTT group and membership configuration metadata)

From header: MCPTT ID of originator (or can be anything when MCPTT ID of caller is carried in body)

To header: MCPTT ID of Group (or can be anything when MCPTT ID of Group is carried in body)

P-preferred-identity header: public user identity of originator

Contact: IP address of MCPTT originator UE

P-preferred-service header: MCPTT service identifier

For the scenario like group call, the entity populating non-registration request is not aware of the public user identity of the group members. So that the request URI header needs to include public service identity in the non-registration request. The public service identity identifies the group owner or the MCPTT server 300 where a particular group is defined or where the group call is to be hosted. In order to populate public service identity in the request URI, the MCPTT client 102 can obtain this information from the metadata of the group definition in group management server when the requesting MCPTT user is member of that group. The MCPTT system to obtain public service identity from the group definition can be through a Hypertext Transfer Protocol (HTTP) request.

A non-registration request can include the MCPTT group identity in the header which will be used by a group owner to resolve the MCPTT group identity into the MCPTT user identity of its group members. Upon receiving the request at the IMS operator domain, it will use the MCPTT service identifier to route the request to the MCPTT server 300. If the request URI which has public service identity does not belong to the received MCPTT system then it forwards the non-registration request back to the IMS core for handling of the request. The IMS core looks at the request URI where the request URI is identifiable in the MCPTT application domain to route the request to the appropriate target MCPTT system where the group is defined. At the MCPTT server 300 where the public service identity is defined i.e., where the group is defined, the MCPTT server 300 resolves the MCPTT group identity to its members. The MCPTT server 300 maintains the group, the MCPTT server 300 obtains the public user identity corresponding to MCPTT user identity of each of those of group members. The MCPTT server 300 may have to contact different MCPTT systems for obtaining the stored relationship information between MCPTT user identities and signaling plane public user identity of a user as explained in the Identity Translation in multiple MCPTT systems scenario. Further, the MCPTT user identity for each group member is replaced with the respective public user identity before sending the request to the IMS operator domain for delivering towards the MCPTT user identity. Then the remaining operation/function to deliver the non-registration request to the target MCPTT user is as per the 3GPP procedures.

In an embodiment, each MCPTT group ID shall be mapped to the public service identity for the MCPTT server 300, where the group is defined. The MCPTT server 300 is configured to manage the mapping between the MCPTT group IDs and the public service identities.

Identity Translation in Shared UE Scenario:

In an embodiment, in order for the shared UE concept to work for MCPTT service there are at least three ways how MCPTT user identity and public user identity can be managed.

Pre-configure multiple public user identities per UE, each associated to their respective MCPTT user identity One public user identity per UE which can be used by multiple MCPTT user identities Dynamically assign user identity to the UE based on the MCPTT user identity Irrespective of how the MCPTT user identity and public user identity is managed for the sharing UEs, the relationship between the MCPTT user identity and the signaling plane public user identity of user is established at the time of IMS and the MCPTT service registration. So that, when the MCPTT service is being delivered to the shared UE, the MCPTT server 300 utilizes the relationship between the MCPTT user identity and the signaling plane public user identity of user.

Identity Translation in ID Hiding Scenario:

In an embodiment, for scenarios where the MCPTT user identity hiding is necessary, the originator or target MCPTT user identity in the non-registration request is encrypted and carried either in the body or in the header. The encrypted MCPTT user identity can be decrypted only by the MCPTT operator domain and not by the IMS operator domain. The encryption mechanism to be used for the MCPTT user identity hiding between the MCPTT client and the MCPTT server 300 is pre-agreed and can be done utilizing any of the existing security mechanisms like certificates, tokens and so on.

Further, the MCPTT server 300 has to replace the unencrypted MCPTT user identity received in the non-registration request to corresponding public user identity before delivering the request to the target MCPTT user via the IMS operator domain. However the UE 100 receiving the requests with encrypted MCPTT user identity can decrypt before rendering the request to the MCPTT user.

Identity Translation in Multiple MCPTT Systems Scenario:

When identity translation is required to be performed and the relationship information between MCPTT user identity and signaling plane public user identity of the user is stored in another MCPTT system e.g., because the MCPTT user is a subscriber in another MCPTT system such as in the interconnect scenario of the MCPTT application, one MCPTT system can query the other MCPTT system to resolve the identity translation. In an embodiment, The MCPTT system maintains the relationship information between the MCPTT user identity and the signaling plane public user identity of the user in a globally unique and globally accessible database or it can be in a distributed database. Mechanisms to query and retrieve the relationship information in the distributed system could be similar to a DNS lookup or service level agreements between the two MCPTT system operators by using a simple HTTP query or the like with associated security methods. In another embodiment, there could be a dedicated network to a network interface between the two MCPTT systems to exchange the mapping information. The mechanisms to obtain the relationship information from the global database can be using the HTTP protocol.

Similarly when the MCPTT system on the originating or terminating side receives a non-registration request with only public user identity of target user included, the MCPTT server 300 can do a reverse lookup in the stored relationship information between the MCPTT user identity and the signaling plane public user identity of the user to know the MCPTT user identity of target user.

Figure 4:
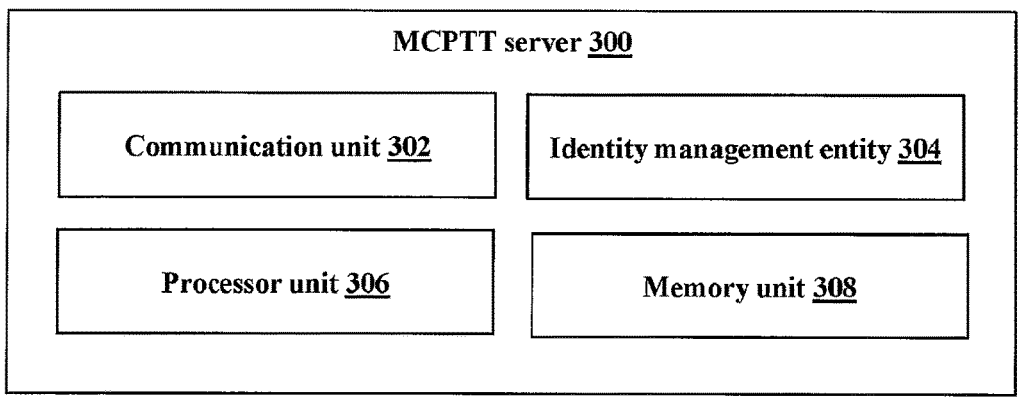
FIG. 4 shows various units of a MCPTT server, according to embodiments as disclosed herein.

FIG. 4 shows various units of the MCPTT server 300, according to the embodiments as disclosed herein. The MCPTT server 300 includes a communication unit 302, an identity management entity 304, a processor unit 306, and a memory unit 308. The processor unit 306 is coupled to the memory unit 308. The processor unit 306 is configured to receive the first request message to establish the call between the first MCPTT client 100 and one or more second MCPTT client from the signaling plane entity. The first request message includes the application plane identity of the one or more second MCPTT client. The application plane identity can be, for example but not limited to, the MCPTT client identity and the MCPTTT group identity. After receiving the first request message, the processor unit 306 is configured to translate the application plane identity of the one or more second MCPTT client to the signaling plane identity of the one or more second MCPTT client. The signaling plane identity can be the public user identity. In an embodiment, the signaling plane identity of the one or more second MCPTT client is predefined and is stored in the identity management entity 304 during the service registration. The identity management entity is stored at one of the MCPTT server 300, the group management server, the signaling plane domain entity or the like.

In an embodiment, the application plane identity of the one or more second MCPTT client to the signaling plane identity of the one or more second MCPTT client is translated by identifying the signaling plane identity of the one or more second MCPTT client from the identity management entity 304.

In an embodiment, the application plane identity of the one or more second MCPTT client to the signaling plane identity of the one or more second MCPTT client is translated by retrieving the MCPTT client identity for each of the second MCPTT client associated with the application plane identity, and identify the signaling plane identity corresponding to each of the second MCPTT identity from the identity management entity 304.

Based on translating the application plane identity of the one or more second MCPTT client to the signaling plane identity of the one or more second MCPTT client, the communication unit 302 is configured to send one or more second request message including the signaling plane identity of the one or more second MCPTT client to establish the call to the signaling plane entity.

Further, the communication unit 302 is configured for communicating internally between internal units and with external devices via one or more networks. The memory unit 308 may include one or more computer-readable storage media. The memory unit 308 may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the memory unit 308 may, in some examples, be considered a non-transitory storage medium. The term "non-transitory" may indicate that the storage medium is not embodied in a carrier wave or a propagated signal. However, the term "non-transitory" should not be interpreted that the memory unit 308 is non-movable. In some examples, the memory unit 308 can be configured to store larger amounts of information than a memory. In certain examples, a non-transitory storage medium may store data that can, over time, change (e.g., in Random Access Memory (RAM) or cache).

Although the FIG. 4 shows exemplary units of the MCPTT server 300 but it is to be understood that other embodiments are not limited thereon. In other embodiments, the MCPTT server 300 may include less or more number of units. Further, the labels or names of the units are used only for illustrative purpose and does not limit the scope of the disclosure. One or more units can be combined together to perform same or substantially similar function in the MCPTT server 300.

Figure 5:
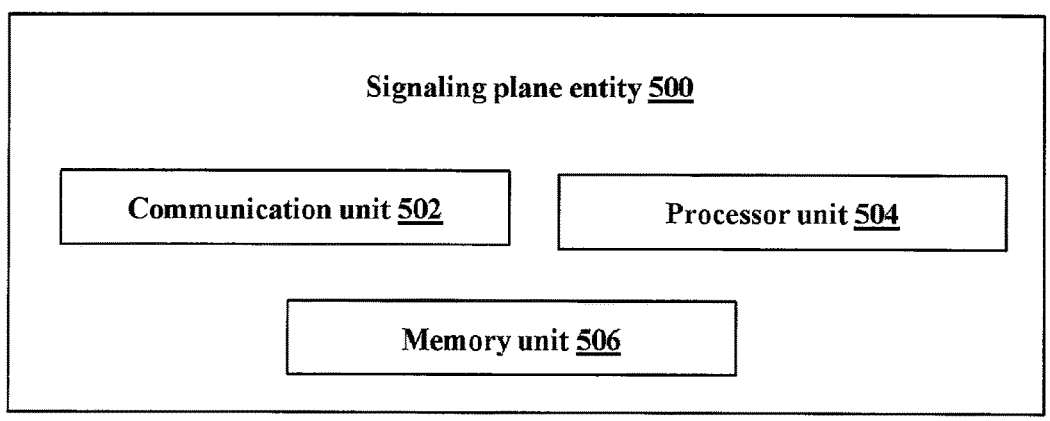
FIG. 5 shows various units of a signaling plane entity, according to embodiments as disclosed herein.

FIG. 5 shows various units of the signaling plane entity 500, according to the embodiments as disclosed herein. The signaling plane entity 500 includes a communication unit 502, a processor unit 504, and a memory unit 506. The processor unit 504 is coupled to the memory unit 506. The signaling plane entity can be, for example but not limited to, the SIP core signaling plane entity, the IMS core signaling plane entity, the HSS entity, or the like. The communication unit 502 is configured to receive the first request message from the first MCPTT client 100 to establish a call with one or more second MCPTT client. The first request message includes the application plane identity of the one or more second MCPTT client. Based on receiving the first request message from the first MCPTT client 100, the communication unit 502 is configured to send the first request message to the MCPTT server 300. Upon sending the first request message to the MCPTT server 300, the processor unit 504 is configured to receive one or more second request message from the MCPTT server 300 including one or more signaling plane identity of the one or more second MCPTT client. Further, the processor unit 504 is configured to establish the call with the one or more second MCPTT client based on the signaling plane identity.

Further, the communication unit 502 is configured for communicating internally between internal units and with external devices via one or more networks. The memory unit 506 may include one or more computer-readable storage media. The memory unit 506 may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the memory unit 506 may, in some examples, be considered a non-transitory storage medium. The term "non-transitory" may indicate that the storage medium is not embodied in a carrier wave or a propagated signal. However, the term "non-transitory" should not be interpreted that the memory unit 506 is non-movable. In some examples, the memory unit 506 can be configured to store larger amounts of information than a memory. In certain examples, a non-transitory storage medium may store data that can, over time, change (e.g., in Random Access Memory (RAM) or cache).

Although the FIG. 5 shows exemplary units of the signaling plane entity 500 but it is to be understood that other embodiments are not limited thereon. In other embodiments, the signaling plane entity 500 may include less or more number of units. Further, the labels or names of the units are used only for illustrative purpose and does not limit the scope of the disclosure. One or more units can be combined together to perform same or substantially similar function in the signaling plane entity 500.

Figure 6:
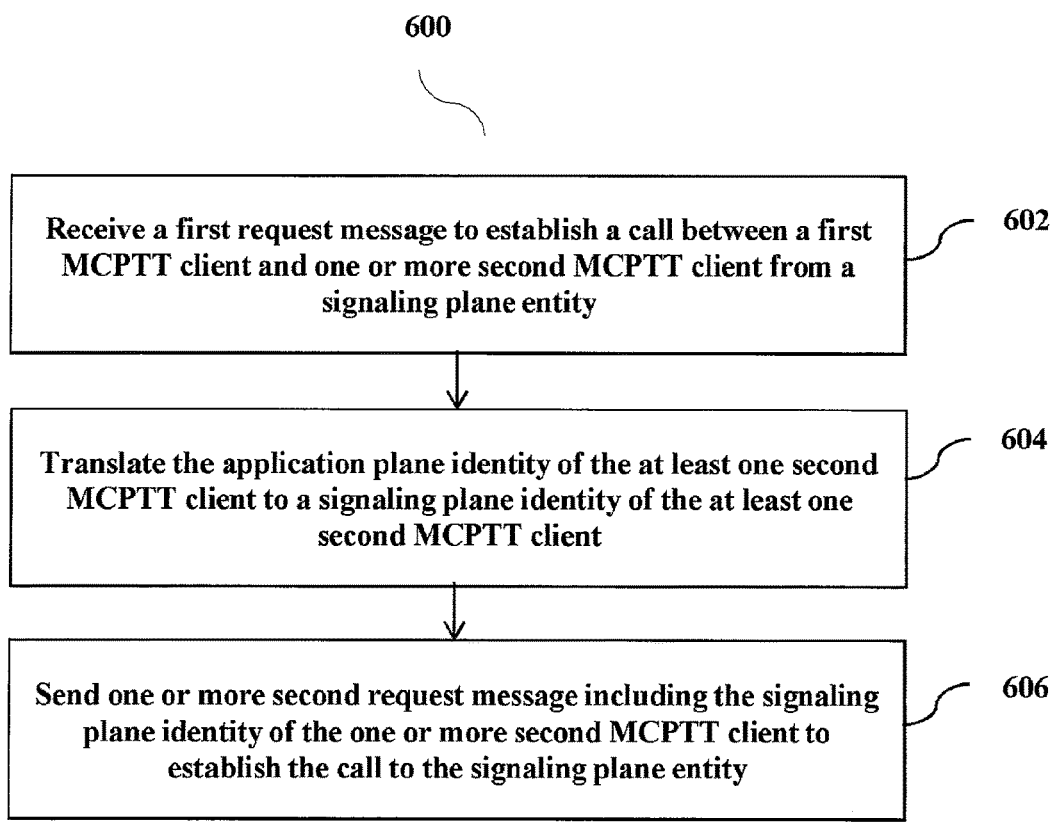
FIG. 6 is a flow diagram illustrating a method for identity management across multiple planes at a MCPTT server, according to embodiments as disclosed herein.

FIG. 6 is a flow diagram illustrating a method 600 for identity management across multiple planes at the MCPTT server 300, according to the embodiments as disclosed herein. At step 602, the method 600 includes receiving the first request message to establish the call between the first MCPTT client and one or more second MCPTT client from the signaling plane entity. In an embodiment, the method 600 allows the communication unit 302 to receive the first request message to establish the call between the first MCPTT client 100a and one or more second MCPTT client 100b or 100c from the signaling plane entity. At step 604, the method 600 includes translating the application plane identity of the one or more second MCPTT client to the signaling plane identity of the one or more second MCPTT client 100a. In an embodiment, the method 600 allows the processor unit 304 to translate the application plane identity of the one or more second MCPTT client 100b and 100c to the signaling plane identity of the at least one second MCPTT client 100b or 100c. At step 606, the method 600 includes sending one or more second request message including the signaling plane identity of the one or more second MCPTT client to establish the call to the signaling plane entity. In an embodiment, the method 600 allows the communication unit 302 to send one or more second request message including the signaling plane identity of the one or more second MCPTT client 100b or 100c to establish the call to the signaling plane entity.

The various actions, acts, blocks, steps, or the like in the method 600 may be performed in the order presented, in a different order or simultaneously. Further, in some embodiments, some of the actions, acts, blocks, steps, or the like may be omitted, added, modified, skipped, or the like without departing from the scope of the disclosure.

Figure 7:
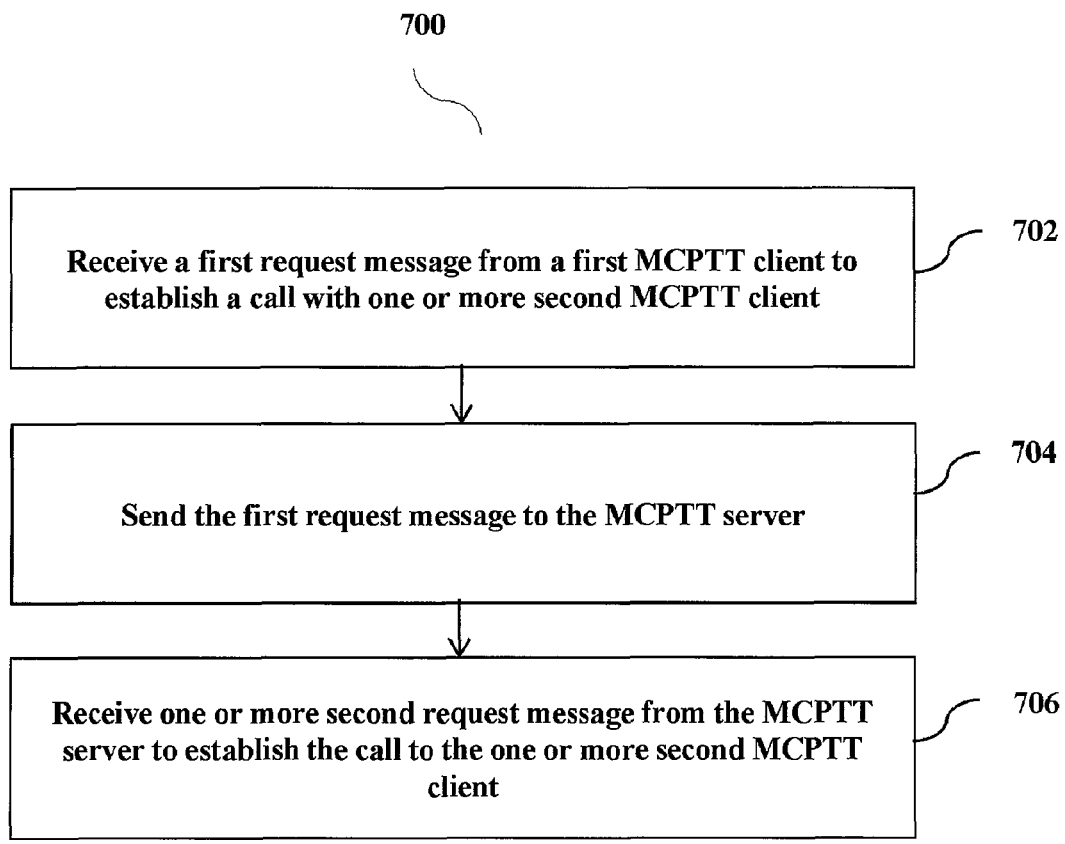
FIG. 7 is a flow diagram illustrating a method for identity management across multiple planes at a signaling plane entity, according to embodiments as disclosed herein.

FIG. 7 is a flow diagram illustrating a method 700 for identity management across multiple planes at the signaling plane entity 500, according to the embodiments as disclosed herein. At step 702, the method 700 includes receiving the first request message from the first MCPTT client to establish the call with one or more second MCPTT client. In an embodiment, the method 700 allows the communication unit 502 to receive the first request message from the first MCPTT client 100a to establish the call with one or more second MCPTT client 100b or 100c. At step 704, the method 700 includes sending the first request message to the MCPTT server 300. In an embodiment, the method 700 allows the communication unit 502 to send the first request message to the MCPTT server 300. At step 706, the method 700 includes receiving one or more second request message from the MCPTT server 300 to establish the call to the one or more second MCPTT client 100b or 100c. In an embodiment, the method 700 allows the communication unit 502 to receive one or more second request message from the MCPTT server 300 to establish the call to the one or more second MCPTT client 100b or 100c.

The various actions, acts, blocks, steps, or the like in the method 700 may be performed in the order presented, in a different order or simultaneously. Further, in some embodiments, some of the actions, acts, blocks, steps, or the like may be omitted, added, modified, skipped, or the like without departing from the scope of the disclosure.

Figure 8:
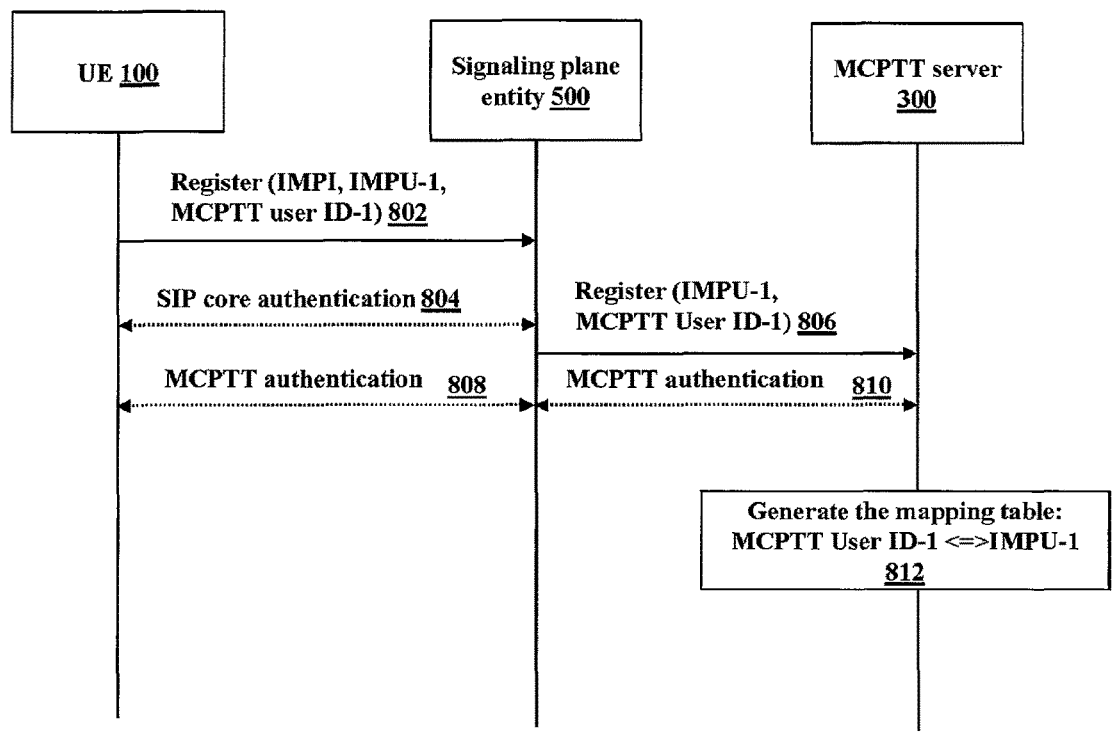
FIG. 8 is a sequence diagram showing various signaling messages for a mapping table creation procedure, according to embodiments as disclosed herein.

FIG. 8 is a sequence diagram showing various signaling messages for the mapping table creation procedure, according to the embodiments as disclosed herein. In an embodiment, the SIP core identities (i.e., Private and Public identities) can be assigned dynamically or pre-assigned for the UE/user. The MCPTT identities namely MCPTT user ID, MCPTT public ID, and group ID are pre-configures in the UE 100 (i.e., MCPTT client). The group ID or the MCPTT user ID and/or MCPTT Public identity is used to identify the callee (other terminating side of the communication) by a called party (who initiates communication) for service establishment. If the callee ID is addressed as the group ID, then it refers to more than one MCPTT user IDs.

In an embodiment, the UE 100 registers (802) with the signaling plane identity 500. Based on the registration, a SIP core authentication procedure is performed (804) between the UE 100 and the signaling plane identity 500. The signaling plane identity 500 registers (806) with the MCPTT server 300. After the registration, the MCPTT authentication procedure is performed (808) between the UE 100 and the signaling plane identity 500. The MCPTT authentication procedure is performed (810) between the signaling plane identity 500 and the MCPTT server 300. After the MCPTT authentication procedure, the MCPTT server 300 generates (812) the mapping table.

In an embodiment, the UE 100 generates a SIP REGISTER request for the MCPTT service registration. The information about the MCPTT user identity of the user of the UE 100 who is willing to be registered is included in the SIP from header of SIP REGISTER request and is sent to the MCPTT server 300 via the SIP core 452. This information is used for the service registration and authentication at the MCPTT AS 404. The other values of SIP headers except from the header are same as normal SIP (IMS) procedure. The SIP core name e.g., IMS domain name, IMPU of user, IP address of UE 100 are included in a request URI, to header and Contact header, respectively. The MCPTT service identifier is also carried in the contact header. After receiving the SIP REGISTER request, the MCPTT AS 404 process the request and store the mapping information between the MCPTT ID and the IMPU of the user at the application domain, such as identity management server 402, and the MCPTT AS 404. This is only an example of a registration procedure where the UE 100 registers with the MCPTT server 300 via the SIP core 452, however, the order of registration may vary subject to implementation choice.

In an embodiment, the mapping table may be created statically, where the IMPU is pre-assigned to the UE 100. If the network maintains the static mapping table, then in the registration message, the UE 100 may not send the MCPTT user ID. After successful registration, the MCPTT server 300 may set the flag as active in the mapping table against the mapping procedure to indicate the registration is done successfully.

In another embodiment, if the IMPU is dynamic for the user, for example, when shared UE is used, then the IMPU may belong to the UE (which implies that IMPI and IMPU may be pre-assigned to the UE), in this case, the mapping table is generated as shown in the FIG. 8.

In another embodiment, if the IMPU is assigned (for example, from a pool of IMPUs, when using Trusted Node Authentication (TNA)) by the MCPTT service provider domain (for example, can be the identity management server 402), then the identity management server 402 may generate/populates the mapping table entry dynamically in the MCPTT server 300 and/or in the SIP core 452.

In an embodiment, in order to establish the call with the one or more second MCPTT client, the UE 100 registers with the signaling plane entity. After registering with the signaling plane entity, the SIP core authentication procedure is performed between the UE 100 and the signaling plane entity. After performing the SIP core authentication procedure, the signaling plane entity registers with the MCPTT server 300. Based on the SIP core authentication procedure, the MCPTT authentication procedure is performed between the UE 300 and the signaling plane entity. The MCPTT authentication procedure is performed the signaling plane entity and the MCPTT server 300. The MCPTT server 300 generates the mapping table. Based on the mapping table, the call establishment procedure is initiated.

Figure 9:
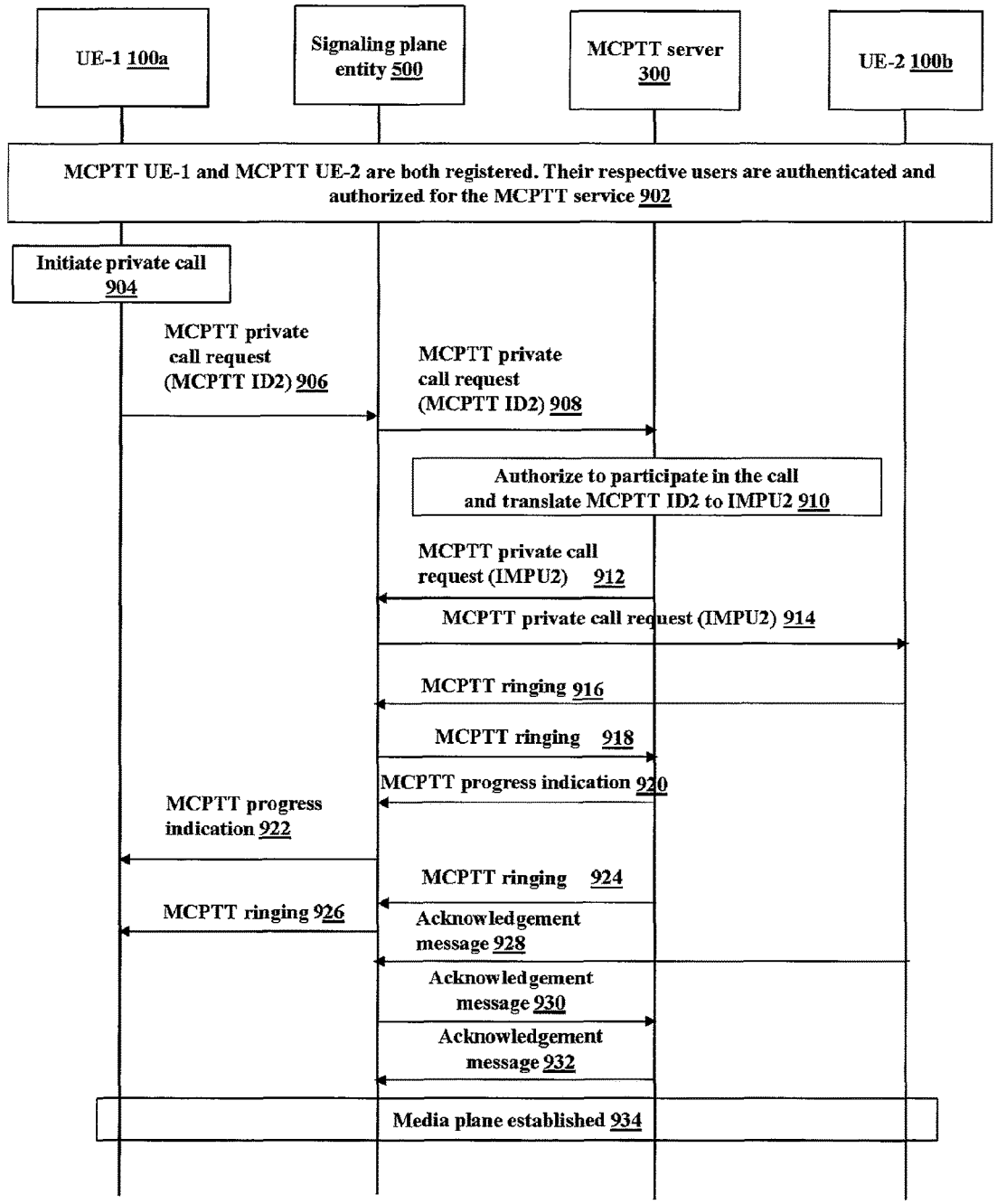
FIG. 9 is a sequence diagram showing various signaling messages for a MCPTT private call setup, according to embodiments as disclosed herein.

FIG. 9 is a sequence diagram showing various signaling messages for the MCPTT private call setup, according to the embodiments as disclosed herein. Initially, the MCPTT UE-1 100*a* and the MCPTT UE-2 100*b* are registered (902). Their respective users of the UE 100 are authenticated and authorized for the MCPTT service. Further, the MCPTT UE-1 100*a* initiates (904) the private call and the MCPTT UE-1 100*a* sends (906) the MCPTT private call request to the signaling plane entity 500. The signaling plane entity 500 sends (908) the MCPTT private call request to the MCPTT server 300. The MCPTT server 300 authorizes (910) to participate in the call and translates the MCPTT identify to the signaling plane identity. The MCPTT server 300 sends (912) the MCPTT private call request message to the signaling plane entity 500. The signaling plane entity 500 sends (914) the MCPTT private call request to the MCPTT UE-2 100*b*. The UE-2 100*b* sends (916) the MCPTT ringing indication to the signaling plane entity 500. Once the signaling plane entity 500 receives the MCPTT ringing indication from the UE-2 100*b*, the signaling plane entity 500 sends (918) the MCPTT ringing indication to the MCPTT server 300. The MCPTT server 300 sends (920) the MCPTT progress indication to the signaling plane entity 500. The signaling plane entity 500 sends (922) the MCPTT progress indication to the UE-1 100*a*. Based on the MCPTT progress indication, the MCPTT server 300 sends (924) the MCPTT ringing signal to the signaling plane entity 500. The signaling plane entity 500 sends (926) the MCPTT ringing signal to the UE-1 100*a*. The UE-2 100*b* sends (928) the acknowledgement message to the signaling plane entity 500. The signaling plane entity 500 sends (930) the acknowledgement message to the MCPTT server 300. The MCPTT server 300 sends (932) the acknowledgement message to the signaling plane entity 500.

Based on the translation procedure, the media plane are established (934) among the MCPTT UE-1 100*a*, the MCPTT UE-2 100*b*, the signaling plane entity 500, and the MCPTT server 300.

In an embodiment, the MCPTT client 1 generates the SIP INVITE request to setup the private call with the target user without being aware of the public user identity of the target user but aware of the MCPTT user identity of the target user. So that, the MCPTT user identity of target user is used in the request URI instead of public user identity of the target user. The MCPTT client 100*a* can indicate that this message that is a request for MCPTT service by including the MCPTT service identifier in P-Preferred-Service header. The MCPTT user identity of the MCPTT client 1 as originator and MCPTT client 2 as target user can be added in either from and to header respectively or in the body of the request. The information may be encrypted. Further, the MCPTT client 100*a* sends the request to the MCPTT server 300 which is serving the MCPTT client 100*a* via the SIP core 452. When receiving the INVITE request from the originator, the SIP core 452 determines the P-Preferred-Service header and decides to forward the request to MCPTT server 300. Further, the MCPTT server 300 looks at the MCPTT user identity of the target user in the request URI and translates it to public service identity of the target user by querying the mapping information between the MCPTT user identity and the public service identity which is stored during the service registration, after decrypting the ID if it is encrypted. Then using the public service identity, the SIP INVITE message is processed further. Further, the request includes public service identity of the target user instead of MCPTT user identity of the target user.

Figure 10:
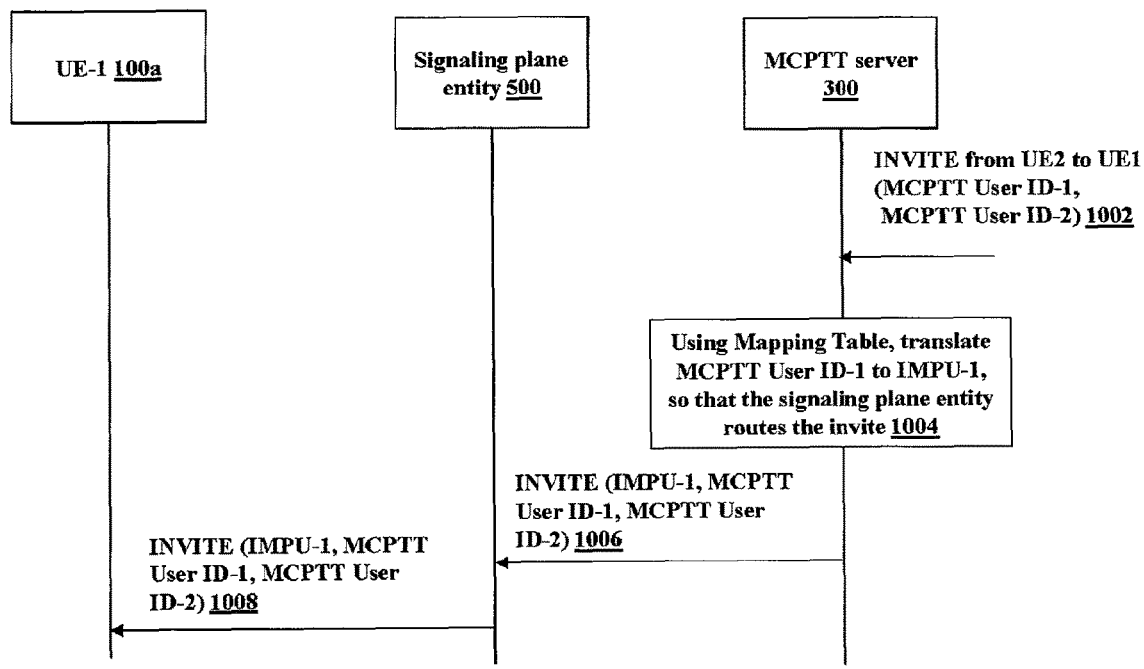
FIG. 10 is a sequence diagram showing various signaling messages for ID translation using a mapping table, according to embodiments as disclosed herein.

FIG. 10 is a sequence diagram showing various signaling messages for ID translation using the mapping table, according to the embodiments as disclosed herein. The MCPTT AS 404 receives (1002) invite for the UE-1 100*a*, which is registered with it. On receiving the invite, the MCPTT server determines the MCPTT user ID of the callee of the UE-1 100*a* and identifies the IMPU of the UE-1. The MCPTT server then translates (1004) the MCPTT user ID of UE-1 100*a* to the corresponding IMPU of the UE-1, so that the SIP core 452 can route (1006 and 1008) the INVITE to the UE-100. It should be note that, the SIP INVITE message includes all other possible parameters in addition to the above mentioned parameters.

Figure 11:
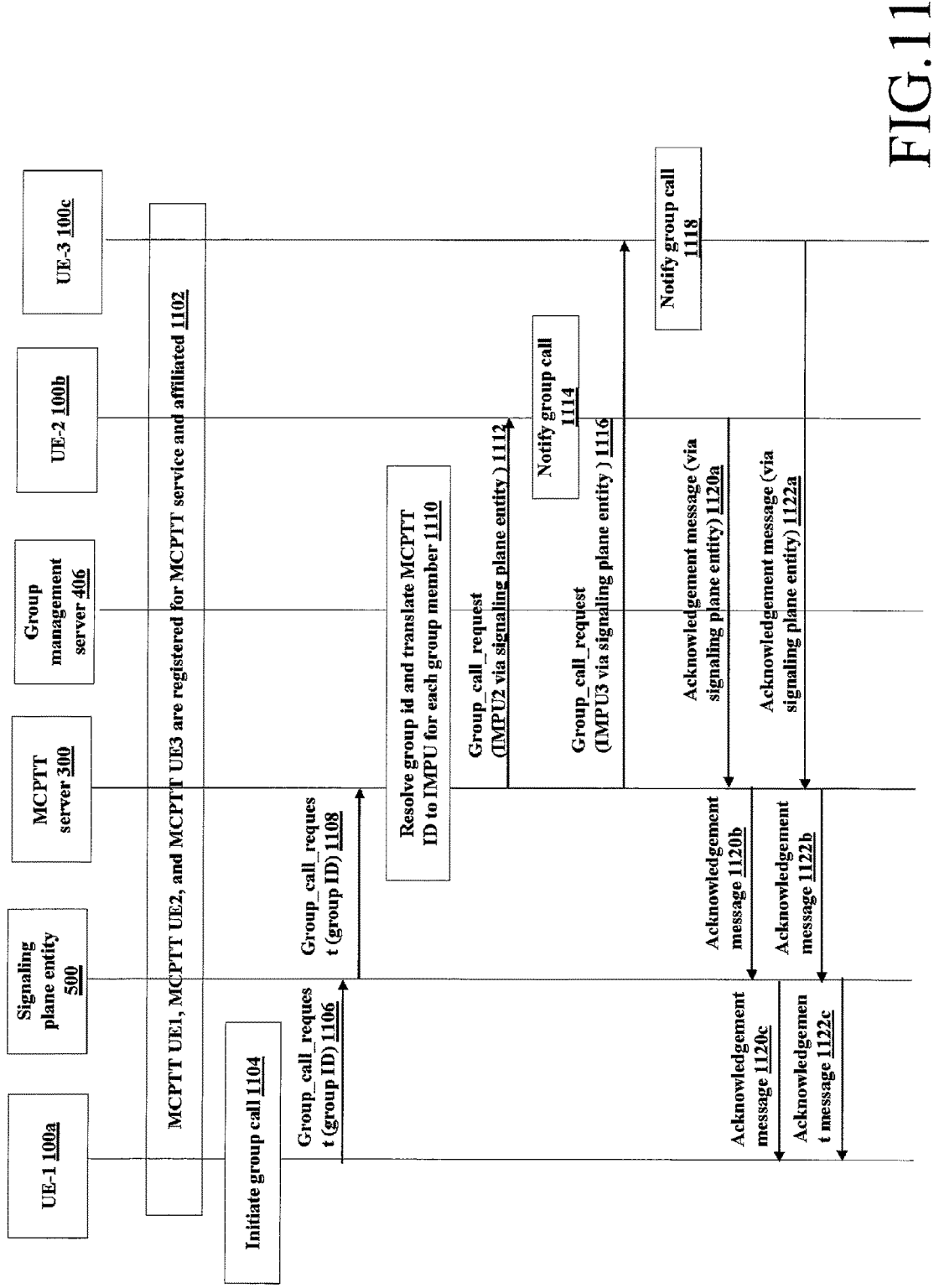
FIG. 11 is a sequence diagram showing various signaling messages for a pre-arranged group call setup, according to embodiments as disclosed herein.

FIG. 11 is a sequence diagram showing various signaling messages for pre-arranged group call setup, according to the embodiments as disclosed herein. The UE-1 100*a*, the UE-2 100*b*, and the UE-3 100*c* are registered (1102) for the MCPTT service. The UE-1 100*a* initiates (1104) the group call. The UE-1 100*a* sends (1106) the group_call_request along with the group ID to the signaling plane entity 500. The signaling plane entity 500 sends (1108) the group_call_request along with the group ID to the MCPTT server 300. The MCPTT server 300 and the group management server 406 determine the group identification and translates (1110) the MCPTT ID to IMPU for each group member. The MCPTT server 300 sends (1112) the group_call_request (i.e., IMPU2) via the signaling plane entity 500 to the UE-2 100*b*. The UE-2 100*b* notifies (1114) the group call. The MCPTT server 300 sends (1116) the group_call_request (i.e., IMPU3) via the signaling plane entity 500 to the UE-3 100*c*. The UE-3 100*c* notifies (1118) the group call. The UE-2 100*b* sends (1120*a*) the acknowledgement message via the signaling plane entity 500 to the MCPTT server 300. The MCPTT server 300 sends (1120*b*) the acknowledgement message to the signaling plane entity 500. The signaling plane entity 500 sends (1120*c*) the acknowledgement message to the UE-1 100*a*. The UE-3 100*c* sends (1122*a*) the acknowledgement message via the signaling plane entity 500 to the MCPTT server 300. The MCPTT server 300 sends (1122*b*) the acknowledgement message to the signaling plane entity 500. The signaling plane entity 500 sends (1122*c*) the acknowledgement message to the UE-1 100*a*.

In an embodiment, the pre-arranged group call setup defined by the 3GPP TS 23.179 standard which is shown in the FIG. 11. The FIG. 11 is referred to describe the MCPTT group call setup procedure and how the ID translation works for group call services. However, it is not limited to the flow in the FIG. 11 in terms of name of functional entities and message sequence. The UE-1 100*a*, the UE-2 100*b*, and the UE-3 100*c* are registered for the MCPTT service. The UE-1 100*a* generates the SIP INVITE request to setup the group call with a pre-arranged group without being aware of IMPU of group members but aware of the public service identity of the MCPTT system hosing the group. The information is related to the public service identity of the MCPTT system, where the MCPTT client 1 belongs as a group member is configured in the UE-1 100*a* by accessing the group management server 406. So that, the public service identity of the MCPTT system or the MCPTT group ID is used the request URI to setup the group call. The UE-1 100*a* can indicate that this message is the request for the MCPTT service by using the MCPTT service identifier in the P-Preferred-Service header. The MCPTT ID of the originator and MCPTT ID of the group can be added in either from and to header respectively or in the body. The information may be encrypted. After receiving the INVITE request from the UE-1 100*a*, the SIP core 452 determines the P-Preferred-Service header, determines to forward the request to the MCPTT server 300 which is serving the UE-1 100*a* and then sends the request to the UE 100*b*. The MCPTT server 300 determines the public service identifier or group ID in the request URI. The MCPTT server 300 will route the request to the group owner based on the public service identifier. If the group owner is the MCPTT server 300 itself, it resolves Group ID to identify MCPTT user identity of group members and translates MCPTT user identity to the public user identity for each group member using the mapping table between the MCPTT user identity and the public user identity. If the group member is hosted by another MCPTT system, the MCPTT server 300 obtains the public user identity of that group member from the hosted MCPTT system. The request includes the public user identity of target instead of MCPTT user identity of target and is routed via the SIP core 452 to reach the target user (i.e., UE-2 100*b* or UE-3 100*c*).

Figure 12:
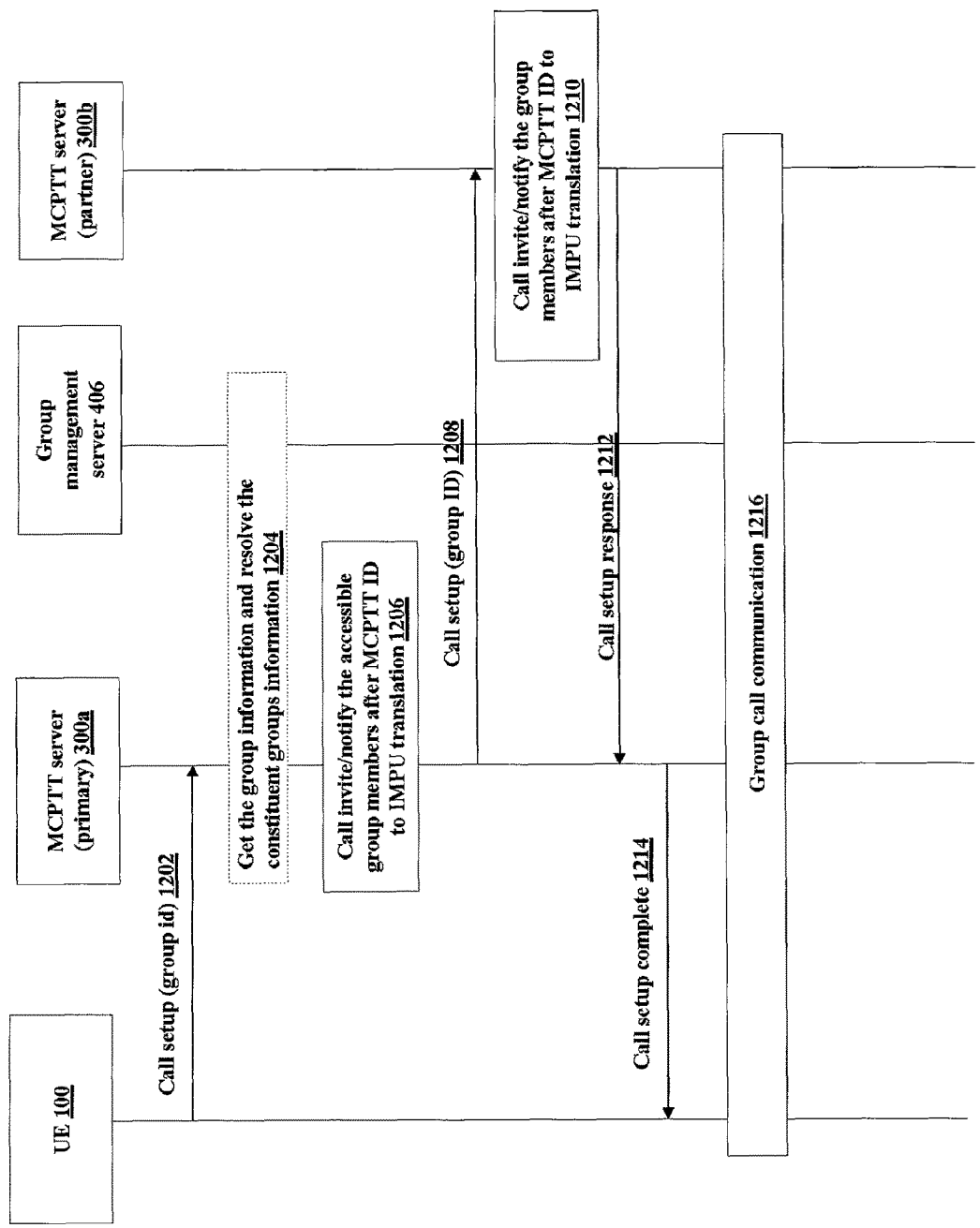
FIG. 12 is a sequence diagram showing various signaling messages for a group call involving groups from multiple MCPTT systems, according to embodiments as disclosed herein.

FIG. 12 is a sequence diagram showing various signaling messages for the group call involving groups from multiple MCPTT systems (i.e., primary MCPTT server 300*a* and partner MCPTT server 300*b*), according to the embodiments as disclosed herein. The UE-1 100*a* sends (1202) the SIP INVITE request to setup the group call with a pre-arranged group to a primary MCPTT server 300*a*. The primary MCPTT server 300*a* and the group management server 406 obtains (1204) the group information and determines the constituent group's information. The primary MCPTT server 300*a* initiates (1206) the call invite procedure or notifies the accessible group members after the MCPTT ID to IMPU translation procedure. The primary MCPTT server 300*a* sends (1208) the call setup along with the group ID to a partner MCPTT server 300*b*. The partner MCPTT server 300 triggers (1210) the call invite procedure or notifies the accessible group members after the MCPTT ID to IMPU translation. The partner MCPTT server 300*b* sends (1212) the call setup response to the primary MCPTT server 300*a*. The primary MCPTT server 300*a* sends (1214) the call setup complete information to the UE-1 100. The group call communication is established (1216) among the UE-1 100*a*, the primary MCPTT server 300*a*, and the partner MCPTT server 300.

FIGS. 13A to 13E are sequence diagrams illustrating the signaling messages for identity hiding, according to embodiments as disclosed herein. As shown in the FIGS. 13A and 13B, at step 1302*a*, the UE-100*a* registers with the signaling plane entity 500. After the registration process, at step 1304*a*, the SIP core authentication procedure is performed between the UE-1 100*a* and the signaling plane entity 500. At step 1306*a*, the signaling plane entity 500 registers with the MCPTT server 300. After the registration process, at step 1308*a*, the MCPTT user authentication procedure is performed between the UE-1 100*a* and the signaling plane entity 500. At step 1310*a*, the MCPTT user authentication procedure is performed between the signaling plane entity 500 and the MCPTT server 300. At step 1312*a*, the UE-1 100*a* establishes the SA. At step 1314*a*, the MCPTT server 300 establishes the SA. At step 1316*a*, the UE-1 100*a* maps the IMPU-1 and the MCPTT User ID-1 (MID1). At step 1318*a*, the MCPTT server 300 maps the IMPU-1 and the MID1 and maps the IMPU-2 and MCPTT User ID-2 (MID2). At step 1320*a*, the UE-2 100*c* maps the IMPU-2 and the MID2. At step 1322*a*, the UE-1 100*a* encrypts the MID1 and MID2 identities based on the SA corresponding to the UE1 100*a* and the MCPTT server 300. At step 1324*a*, the UE-1 100*a* sends the SIP INVITE message to the signaling plane entity 500. The SIP INVITE message includes an INVITE {MID2}, From: {MID1}, To: {MID2}, IMPU-1 and ICSI. At step 1326*a*, the signaling plane entity 500 sends the SIP INVITE message to the MCPTT server 300. At step 1328*a*, the MCPTT server 300 identifies the SA corresponding to the UE1 100*a* using the IMPU-1. Using the identified SA, the MID1 and MID2 identities are decrypted. Further, the IMPU-2 corresponding to the MID2 is identified using the mapping table. Further, the SA corresponding to the UE-2 100*b* is identified using the IMPU-2. Using the identified SA, the MID1 and MID2 identities are encrypted. At step 1330*a*, the MCPTT server 300 sends a SIP INVITE message to the signaling plane entity 500. The SIP INVITE message includes the INVITE {MID2}, From: {MID1}, To: {MID2}, and IMPU-2. At step 1332*a*, the signaling plane entity 500 sends the SIP INVITE message to the UE-2 100*b*. At step 1334*a*, the UE-2 100*b* decrypts the MID1 and MID2 identities based on the SA corresponding to the UE-2 100*b* and the MCPTT server 300.

Figure 13A:
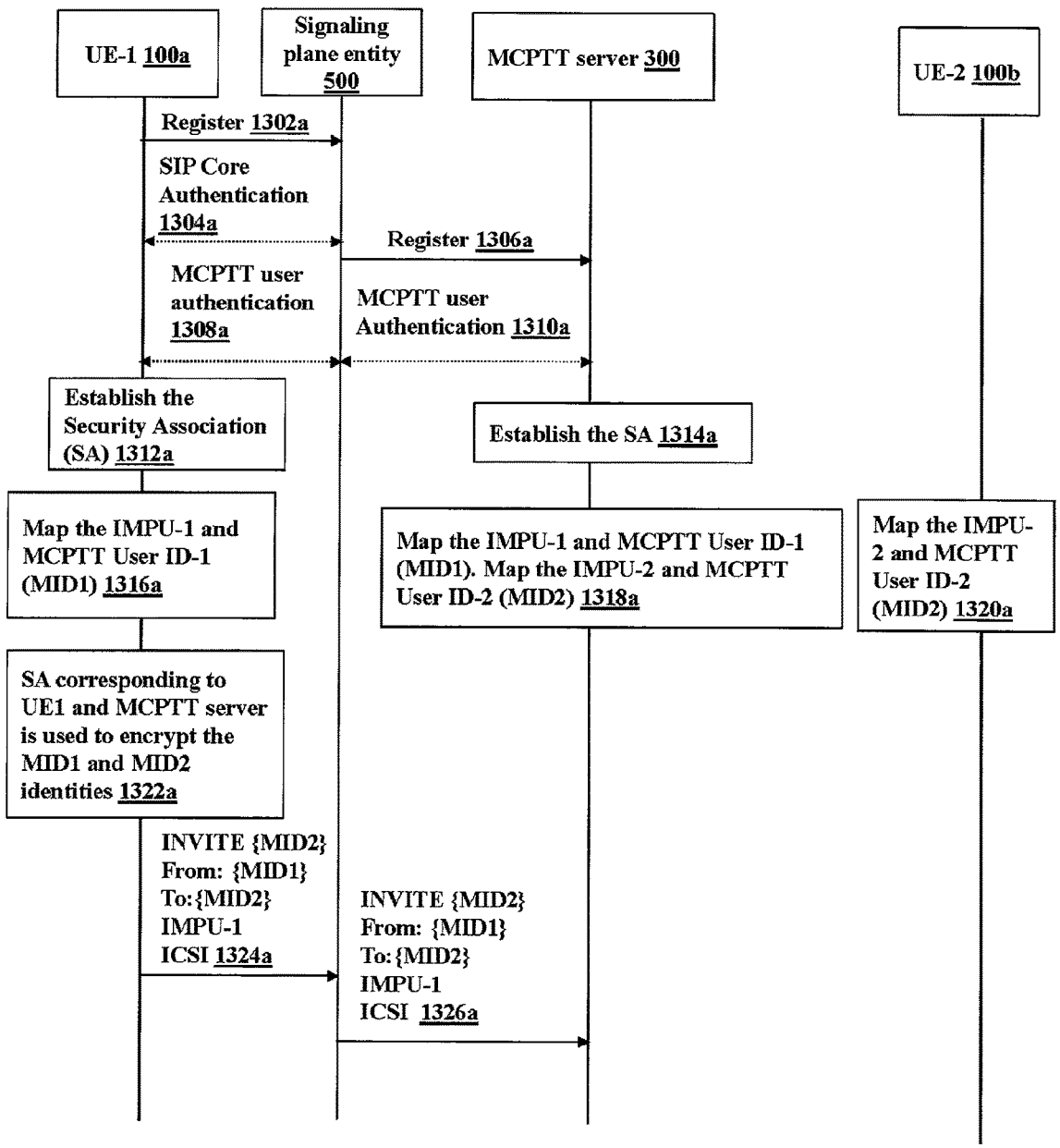
FIGS. 13A to 13E are sequence diagrams illustrating signaling messages for identity hiding, according to embodiments as disclosed herein.
Figure 13B:
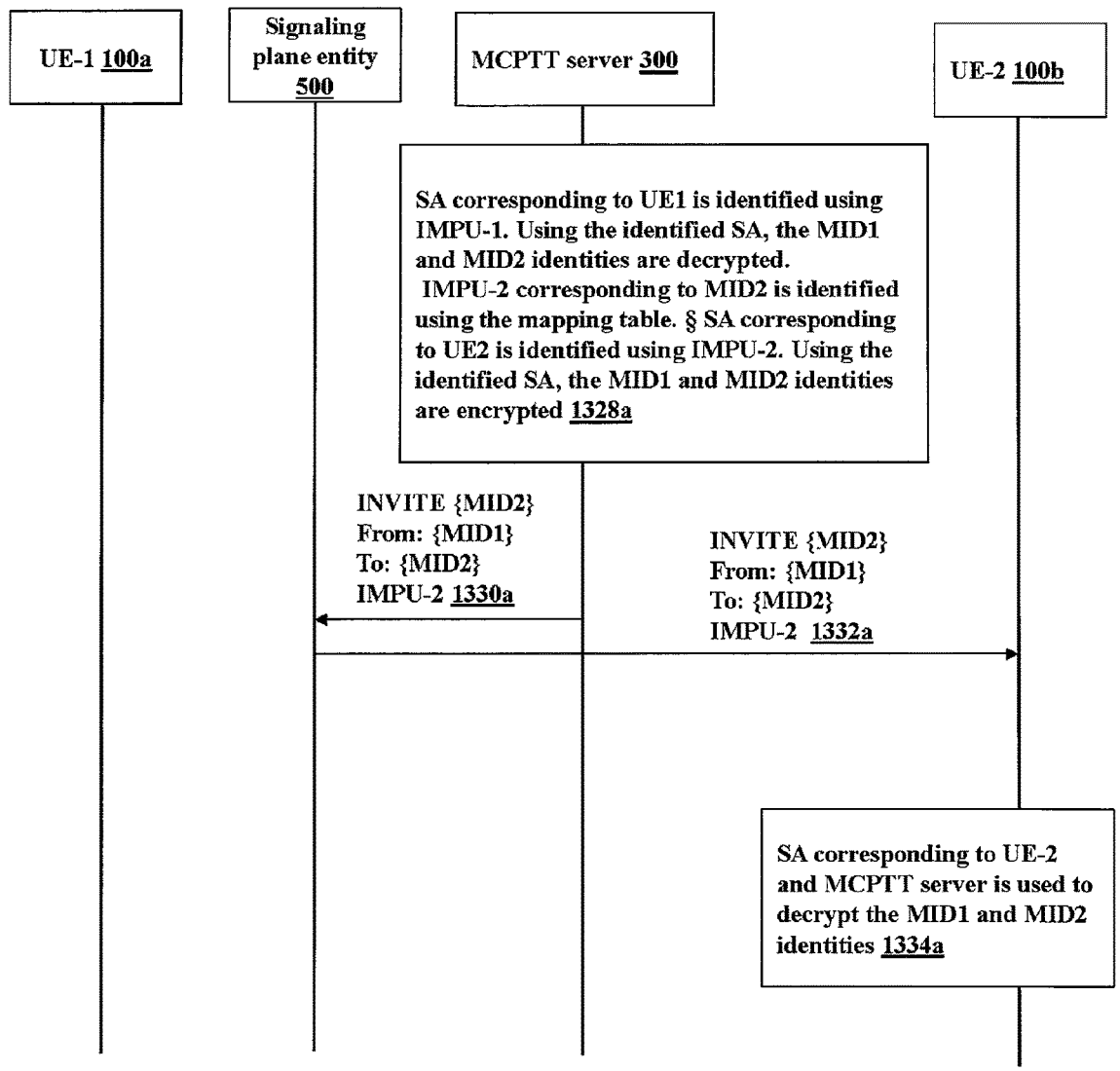
Figure 13C:
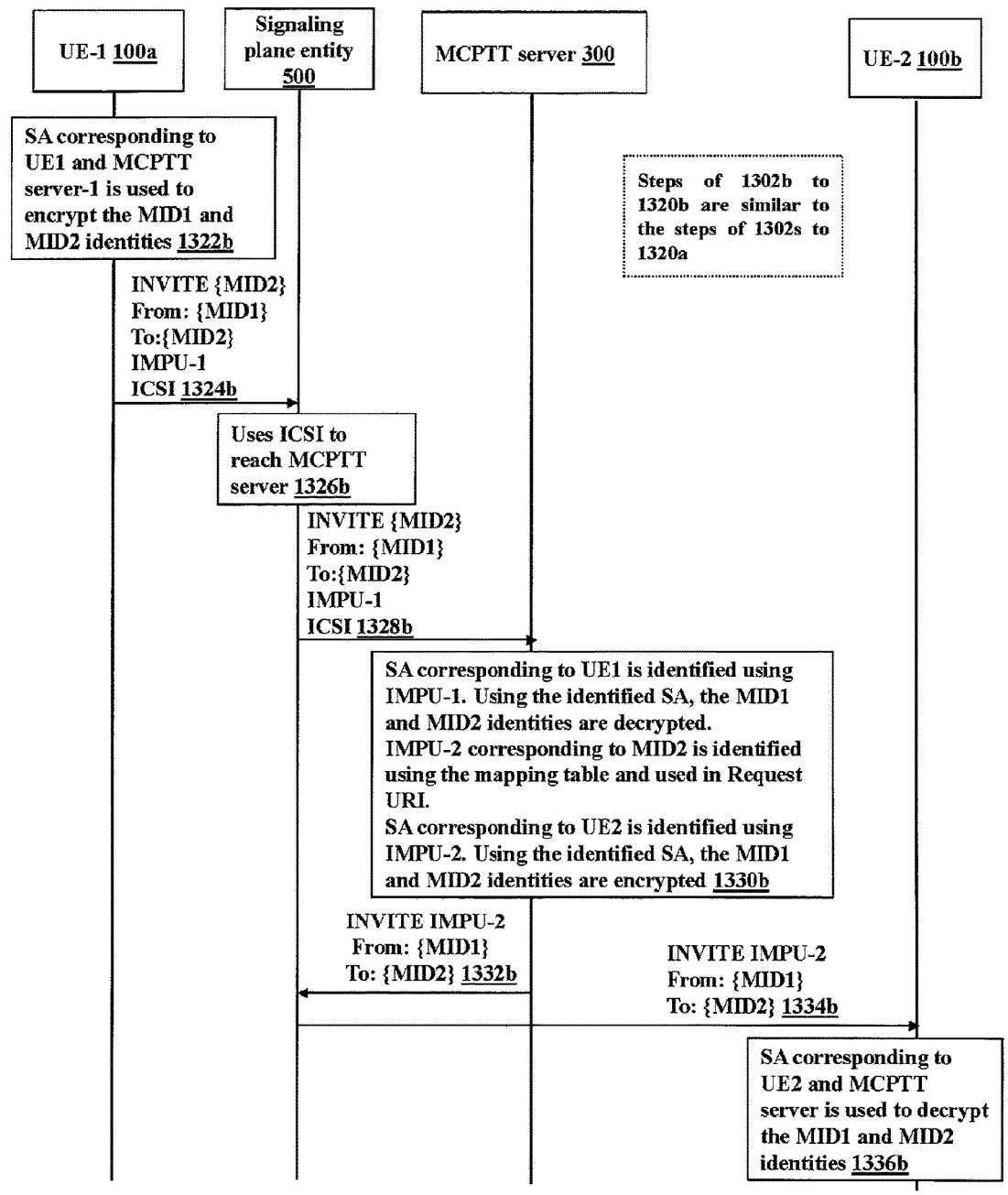

As shown in the FIG. 13C, the steps (1302*b* to 1320*b*) are similar to the steps (1302*a* to 1320*a*) explained in the FIG. 13A. At step 1322*b*, the UE-1 100*a* encrypts the MID1 and MID2 identities by using the SA that corresponds to the UE1 100*a* and the MCPTT server 300. At step 1324*b*, the UE-1 100*a* sends the SIP INVITE message to the signaling plane entity 500. The SIP INVITE message includes the INVITE {MID2}, From: {MID1}, To: {MID2}, IMPU-1, and the ICSI. At step 1326*b*, the signaling plane entity 500 utilizes the IC SI to reach MCPTT server 300. At step 1328*b*, the signaling plane entity 500 send the SIP INVITE message to the MCPTT server 300. At step 1330*b*, the MCPTT server 300 identifies the SA corresponding to the UE1 100*a* using the IMPU-1. Based on the identified SA, the MCPTT server 300 decrypts the MID1 and MID2 identities. Further, the MCPTT server 300 identifies the IMPU-2 corresponding to the MID2 using the mapping table and the request URI. Further, the MCPTT server 300 identifies the SA corresponding to the UE-2 100*b* using the IMPU-2. Based on the identified SA, the MCPTT server 300 decrypts the MID1 and MID2 identities. At step 1332*b*, the MCPTT server 300 sends the SIP INVITE message to the signaling plane entity 500. The SIP INVITE message includes the INVITE IMPU-2, From: {MID1}, To: {MID2}. At step 1334*b*, the signaling plane entity 500 send the SIP INVITE message UE-2 100*b*. At step 1336*b*, the UE-2 100*b* decrypts the MID1 and MID2 identities based on the SA corresponding to the UE-2 100 and the MCPTT server 300.

Figure 13D:
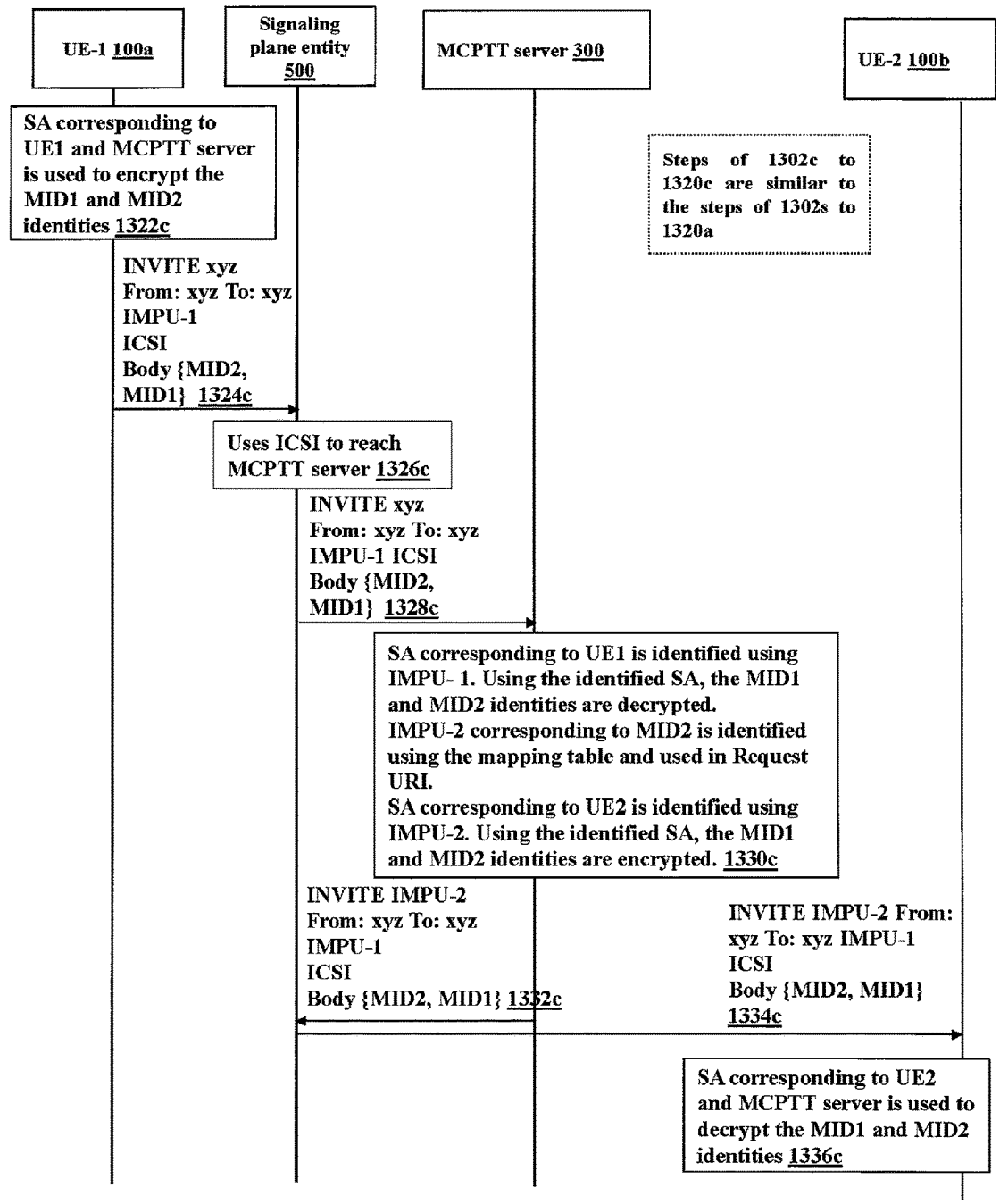

As shown in the FIG. 13D, the steps (1302*c* to 1320*c*) are similar to the steps (1302*a* to 1320*a*) explained in the FIG. 13A. At step 1322*c*, the UE-1 100*a* encrypts the MID1 and MID2 identities by using the SA that corresponds to the UE1 100*a* and the MCPTT server 300. At step 1324*c*, the UE-1 100*a* sends the SIP INVITE message to the signaling plane entity 500. The SIP INVITE message includes INVITE xyz, from: xyz To: xyz, IMPU-1, ICSI, Body {MID2, MID1}. At step 1326*c*, the signaling plane entity 500 utilizes the IC SI to reach MCPTT server 300. At step 1328*c*, the signaling plane entity 500 send the SIP INVITE message to the MCPTT server 300.

At step 1330*c*, the MCPTT server 300 identifies the SA corresponding to the UE1 100*a* using the IMPU-1. Based on the identified SA, the MCPTT server 300 decrypts the MID1 and MID2 identities. Further, the MCPTT server 300 identifies the IMPU-2 corresponding to the MID2 using the mapping table and the request URI. Further, the MCPTT server 300 identifies the SA corresponding to the UE-2 100*b* using the IMPU-2. Based on the identified SA, the MCPTT server 300 decrypts the MID1 and MID2 identities. At step 1332*c*, the MCPTT server 300 sends the SIP INVITE message to the signaling plane entity 500. The SIP INVITE message includes INVITE IMPU-2, From: xyz To: xyz, IMPU-1, ICSI, and Body {MID2, MID1}. At step 1334*c*, the signaling plane entity 500 send the SIP INVITE message UE-2 100*b*. At step 1336*c*, the UE-2 100*b* decrypts the MID1 and MID2 identities based on the SA corresponding to the UE-2 100 and the MCPTT server 300.

Figure 13E:
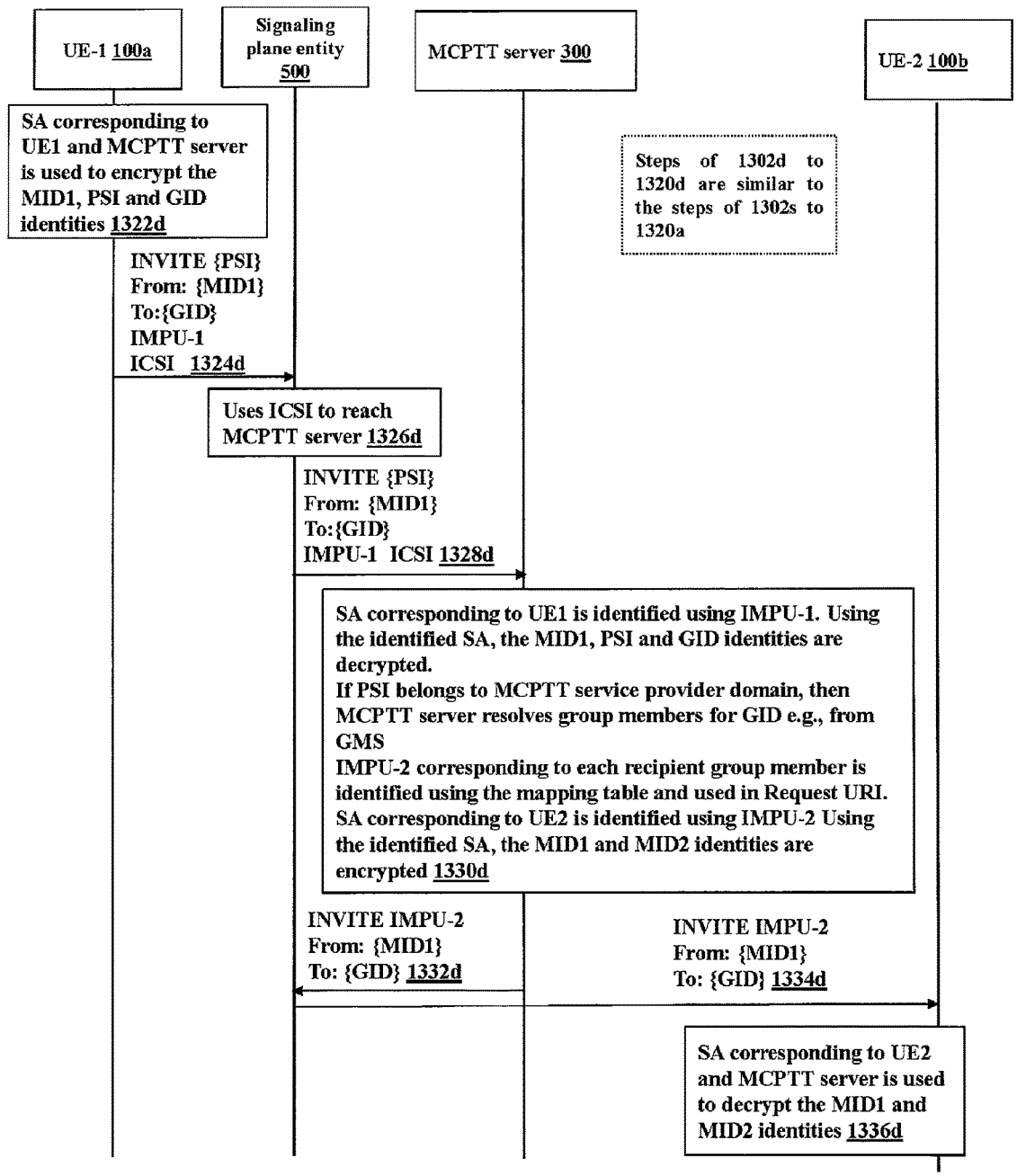

As shown in the FIG. 13E, the steps (1302*d* to 1320*d*) are similar to the steps (1302*a* to 1320*a*) explained in the FIG. 13A. At step 1322*d*, the UE-1 100*a* encrypts the MID1, the PSI and the GID identities by using the SA that corresponds to the UE 100*a* and the MCPTT server 300. At step 1324*d*, the UE-1 100*a* sends the SIP INVITE message to the signaling plane entity 500. The SIP INVITE message includes INVITE {PSI}, From: {MID1}, To: {GID} IMPU-1, and ICSI. At step 1326*d*, the signaling plane entity 500 utilizes the ICSI to reach MCPTT server 300. At step 1328*d*, the signaling plane entity 500 sends the SIP INVITE message to the MCPTT server 300.

At step 1330*d*, the MCPTT server 300 identifies the SA corresponding to the UE1 100*a* using the IMPU-1. Based on the identified SA, the MCPTT server 300 decrypts the MID1, the PSI and the GID identities. Further, if the PSI belongs to the MCPTT service provider domain, then the MCPTT server 300 resolves group members for the GID e.g., from GMS. Further, the IMPU-2 corresponding to each recipient group member is identified using the mapping table and used in request URI. Further, the MCPTT server 300 identifies the SA corresponding to the UE-2 100*b* using the IMPU-2. Based on the identified SA, the MCPTT server 300 encrypts the MID1 and MID2 identities.

At step 1332*d*, the MCPTT server 300 sends the SIP INVITE message to the signaling plane entity 500. The SIP INVITE message includes INVITE IMPU-2, From: {MID1} and To: {GID}. At step 1334*d*, the signaling plane entity 500 send the SIP INVITE message UE-2 100*b*. At step 1336*d*, the UE-2 100*b* decrypts the MID1 and MID2 identities based on the SA corresponding to the UE-2 100 and the MCPTT server 300.

In an embodiment, the UE-1 100*a* performs SIP authentication and registers the IMPU. Further, the signaling plane entity 500 performs the third party registration. The third party registration includes the IMPU. The IMPU identifies the user in the MCPTT service provider domain (i.e., MCPTT server 300). The MCPTT server 300 initiates authentication procedure to verify the authenticity of the MCPTT user ID. Immediately after the authentication procedure or as part of the authentication procedure, the UE-1 100*a* and the MCPTT server 300 establish a SA (e.g., key for encryption, optionally key for integrity protection, negotiated crypto algorithms, or the like) for identity hiding. Further, authentication of the MCPTT user over the MCPTT-1 interface is performed after or before signaling plane entity authentication. In an example, for shareable UEs 100a to 100c, the MCPTT user authentication is performed with the MCPTT server 300 to gain access to the MCPTT client 102 stored on the UEs 100a to 100c and to become an authenticated MCPTT user. After successful mutual authentication procedure, the SA is established between the UE-1 100a and the MCPTT server 300. The MCPTT user authentication procedure generates a ID hiding key (for example 'session key') for the protection (encryption and/or integrity protection) of the MCPTT user identities. For MCPTT user authentication using the MCPTT-1 interface, any one of the following procedure may be performed as specified in the 3GPP TS 33.203 standard.

IMS Authentication and Key Agreement (AKA)

SIP digest authentication

Trusted node authentication

Single Sign On with SIP digest

When the UE-1 100a initiates the MCPTT service by initiating the SIP message (i.e., SIP INVITE), the UE-1 100a encrypts its MCPTT ID (i.e., called party ID) and also encrypts the MCPTT ID of the callee. Partial encryption of the SIP INVITE is performed, that is only the MCPTT user IDs are encrypted in the SIP message. The SIP message is routed to the signaling plane entity 500 using the IMPU of the called party.

In an embodiment, certain values and identifiers transferred in the signalling plane between the MCPTT server 300 in the MCPTT domain and the MCPTT client 102 may be treated as sensitive by the public safety users. To protect these values from all other entities outside of the MCPTT domain, this clause defines an optional mechanism to provide confidentiality protection on these values using an XML encryption mechanism.

In an embodiment, the confidentiality protection may only be applied to the following identifiers and values in the SIP message: MCPTT ID, MCPTT Group ID, User location information, Alerts and an Access token.

Further, the signaling plane entity 500 forwards the SIP message to the MCPTT server 300 using the IMS communication Service ID (ICSI) which is included in the SIP message by the called party UE 100a. Further, once the MCPTT server 300 receives the SIP message with the called party's IMPU, the MCPTT server 300 can fetch the SA associated with the caller IMPU and decrypts the identities. Based on the decrypted callee's MCPTT ID, the MCPTT server 300 fetches the IMPU of the callee from the mapping table (either locally or from the callee's domain). The MCPTT server 300 then includes the IMPU of the callee. The MCPTT server 300 uses the SA associated with the callee's IMPU, and encrypts the MCPTT identities prior to forwarding to the signaling plane entity 500 of the callee.

Further, the signaling plane entity 500 forwards the appropriate SIP message to the callee UE (i.e., UE-1 100a). The UE-1 100a identifies which MCPTT server 300 sent the message to identify the SA and decrypts MCPTT IDs.

By using the above method and system, the ID hiding from the SIP core is achieved. The above flow considers SIP INVITE as illustrative example.

In an embodiment, the ID hiding from the signaling plane entity 500 is used for all the non-register SIP messages (e.g., SUBSCRIBE, PUBLISH, BYE, ACK, OK, or the like) between the UE 100 and the MCPTT server 300. Further, the SIP message includes all other possible parameters in addition to the above mentioned parameters, and as well be encrypted using the SA establishment procedure.

Following are illustrated example.

Encrypted MCPTT ID in a header 1-1 request

Group request

Encrypted MCPTT ID in a body 1-1 request

Group request

Encrypted MCPTT ID in header (1-1 request)

An entity (e.g., originating UE, terminating UE, MCPTT server 300) populates a non-registration request (e.g., SIP INVITE, SIP BYE) for 1-1 requests will include the headers as below:

Request URI: {encrypted MCPTT user identity of the target UE}

From header: {encrypted MCPTT user identity of the originator UE}

To header: {encrypted MCPTT user identity of the target UE}

P-preferred-identity header: public user identity of the originator UE

Contact: IP address of the MCPTT originator UE

P-preferred-service header: MCPTT service identifier

Consider, if the target MCPTT UE2 (MID2) is in the same MCPTT service provider domain, then the corresponding MCPTT server 300 utilizes the locally available mapping table otherwise i.e., if the target MCPTT UE2 (MID2) is not in the same MCPTT service provider domain, then MCPTT server 300 obtains the IMPU-2 corresponding to the MID2 via the mapping information in a global database or an on-demand request to the other MCPTT service provider domain or the service level agreement between the MCPTT service provider domains.

Operation of the encrypted MCPTT ID in Body (1-1 request)

The entity (e.g., originating UE, terminating UE, MCPTT server) populates the non-registration request (e.g., SIP INVITE, SIP BYE) for 1-1 requests will include the headers as below:

Request URI: {encrypted MCPTT user identity of the target UE}

From header: {encrypted MCPTT user identity of the originator UE}

To header: {encrypted MCPTT user identity of the target UE}

P-preferred-identity header: public user identity of the originator UE

Contact: IP address of the MCPTT originator UE

P-preferred-service header: MCPTT service identifier

Consider, if the target MCPTT UE2 (MID2) is in the same MCPTT service provider domain, then the corresponding MCPTT server 300 utilizes the locally available mapping table otherwise i.e., if the target MCPTT UE2 (MID2) is not in the same MCPTT service provider domain, then MCPTT server 300 obtains the IMPU-2 corresponding to the MID2 via the mapping information in the global database or on-demand request to the other MCPTT service provider domain or the service level agreement between the MCPTT service provider domains.

Operation of the encrypted MCPTT ID in header (group request)

The entity (e.g., originating UE, terminating UE, MCPTT server) populates the non-registration request (e.g., SIP INVITE, SIP BYE) for the group requests will include the headers as below:

Request URI: encrypted public service identifier
From header: encrypted MCPTT ID of the originator UE
To header: encrypted MCPTT ID of the Group
P-preferred-identity header: public user identity of the originator UE
Contact: IP address of the MCPTT originator UE
P-preferred-service header: MCPTT service identifier Consider, the Public Service Identifier (PSI) identifies the owner of the group and it can be pre-configured in the MCPTT group and membership configuration metadata. If the PSI belongs to the same MCPTT service provider domain 1, then the corresponding MCPTT server 300 is responsible for the group members resolution in the GID e.g., interacting with the Group Management Server (GMS). Further, the IMPU-2 for each group member is resolved corresponding to the MID via either locally available mapping table or the mapping table available in another MCPTT service provider domain.

If the PSI does not belong to the same MCPTT service provider domain 1, then the MCPTT server 300 obtains the IMPU-2 corresponding to the PSI via the mapping information in the global database or on-demand request to the MCPTT service provider domain 2 or the service level agreement between the MCPTT service provider domains.

Encrypted MCPTT ID in Header (Group Request)

In an embodiment, instead of including PSI and GID in the encrypted headers, the PSI and GID can be encrypted and sent via the body. In such case the entity (e.g., originating UE, terminating UE, MCPTT server 300) populates the non-registration request (e.g., SIP INVITE, SIP BYE) for the group requests will include the headers and body as below.

Request URI: can be anything
From header: can be anything
To header: can be anything
P-preferred-identity header: public user identity of the originator UE
Contact: IP address of the MCPTT originator UE
P-preferred-service header: MCPTT service identifier
Body:
{Request URI: encrypted public service identifier (pre-configured in MCPTT group and membership configuration metadata)
From header: encrypted MCPTT user identity of originator
To header: encrypted MCPTT user identity of target}

Rest of the process remains same as explained for embodiment with encryption in the headers.

In an embodiment, if the Caller and Callee are in different MCPTT Service provider domains (multi-domain), then the procedure is as follows.

The UE 100 performs the SIP Authentication and registers the IMPU. The signaling plane entity 500 performs the third party registration. The third party registration includes the IMPU information. The IMPU information identifies the user in the MCPTT Service provider domain (e.g., MCPTT server 300).

The MCPTT server 300 initiates the authentication procedure to verify the authenticity of the MCPTT user ID. Immediately after the authentication procedure or as part of the authentication procedure, the UE 100 and the MCPTT server 300 establish SA for the identity hiding. Authentication of the MCPTT user over the MCPTT-1 interface is performed after or before the signaling plane entity authentication. For shareable MCPTT UEs 100a-100c, the MCPTT user authentication is performed with the MCPTT server 300 to gain access to the MCPTT client 102 stored on the UE 100 and to become the authenticated MCPTT user. After successful mutual authentication process, the SA is established between the UE 100 (i.e., MCPTT client) and the MCPTT server 300. The MCPTT user authentication procedure generates the ID hiding key (e.g., session key or the like) for the protection (encryption and/or integrity protection) of the MCPTT user identities. For MCPTT user authentication using the MCPTT-1 interface, any one of the following procedure may be performed as specified in the 3GPP TS 33.203 standard.

IMS AKA
SIP Digest authentication
Trusted Node Authentication
Single Sign On with SIP Digest Further, when the UE 100 initiates the MCPTT service by initiating the SIP message (SIP INVITE), the UE 100 encrypts its MCPTT ID (i.e., called party) and also encrypts the MCPTT ID of the callee. Partial encryption of the SIP INVITE 15 performed, that is only the MCPTT User IDs are encrypted in the SIP message. The SIP message is routed to the signaling plane entity 500 using the IMPU of the called party.

Further, the signaling plane entity 500 forwards the SIP message to the appropriate MCPTT server 300 using the ICSI which is included in the SIP message by the called party UE. Once the MCPTT server 300 receives the SIP message with the called party's IMPU, the MCPTT server 300 can identify the SA associated with the caller IMPU and decrypts the identities. Based on the decrypted callee's MCPTT ID, the MCPTT server 300 resolves the Callee's domain and the MCPTT server of the Callee. Further, the MCPTT server 300 encrypts the MCPTT IDs in the SIP message using the security association established with the Callee's MCPTT server. The SA between multiple MCPTT servers can be pre-configured statically or use any well know security association establishment procedure (IKEv2, like so) for SA establishment. Further, the MCPTT server 300 of the caller forwards the SIP message to the Callee's MCPTT server through the signaling plane entity 500.

After receiving the message from the Caller's MCPTT server, the Callee's MCPTT server decrypts the MCPTT IDs using the SA established with Caller's MCPTT server. Based on the resulting Callee's MCPTT User ID, the corresponding IMPU of the callee is retrieved from the mapping table (either locally or from the other entity). The Callee's MCPTT server includes the IMPU of the callee. The Callee's MCPTT server uses the SA associated with the callee's IMPU, and encrypts the MCPTT identities prior to forwarding to the signaling plane entity 500 of the callee. Further, the signaling plane entity 500 forwards the appropriate SIP message to the callee UE 100. The UE 100 knows which MCPTT server 300 sent the message to identify the SA and decrypts MCPTT IDs.

In an embodiment, the MCPTT service provider 400 may require that MCPTT related identities and other sensitive information transferred between the MCPTT client 102 and the MCPTT service on the SIP-1 and SIP-2 interfaces be protected at the application layer from any viewing including protection from viewing at the SIP signaling layer. The symmetric key based protection of the SIP payload using a Client Server key (CSK) may be used to satisfy this requirement.

In an embodiment, Identity based Public Key Cryptography (IDPKC) based on a MIKEY-SAKKE RFC 6509 may be used to establish the CSK between two SIP endpoints. Before IDPKC can be used by the MCPTT client to securely share the encryption key, the MCPTT user shall first be authorized by the KMS for the MCPTT key management services. Once the MCPTT user is authorized, the KMS distributes the user's key material to the MCPTT client 102 as specified in the standard.

In an embodiment, if protection of the SIP-1 and SIP-2 interfaces is required by the MCPTT service provider 400, then MIKEY-SAKKE RFC 6509 shall be used by the MCPTT client 102 to securely transport the CSK over the SIP to all the servers within the MCPTT domain.

In an embodiment, the MCPTT server 300 receives the SIP message with the protected CSK and retrieves it from the message. The MCPTT server 300 associates the MCPTT User's SIP core identity, MCPTT Id and the received CSK. Identity binding is used to uniquely identify the CSK used in protection of the SIP payload in the subsequent SIP messages sent by both the MCPTT client 102 and the MCPTT server 300 within the MCPTT domain.

The purpose of the CSK is the following:

Protection of sensitive MCPTT application data in the signaling plane

Protection of the access token in the signaling plane

FIGS. 14A to 16B are sequence diagrams illustrating signaling messages for identity hiding using an identification (ID) hiding entity, according to embodiments as disclosed herein. As shown in the FIGS. 14A and 14B, at step 1402, the UE-100a registers with the signaling plane entity 500. After the registration process, at step 1404, the SIP core authentication procedure is performed between the UE-1 100a and the signaling plane entity 500. At step 1406, the signaling plane entity 500 registers with a MCPTT service ID hiding entity 1400. At step 1408, the MCPTT service ID hiding entity 1400 registers with the MCPTT server 300. After the registration process, at step 1410, the MCPTT user authentication procedure is performed between the UE-1 100a and the signaling plane entity 500.

At step 1412, the MCPTT user authentication procedure is performed between the signaling plane entity 500 and the MCPTT service ID hiding entity 1400. At step 1414, the MCPTT user authentication procedure is performed between the MCPTT service ID hiding entity 1400 and the MCPTT server 300. At step 1416, the UE-1 100a establishes the SA. At step 1418, the MCPTT server 300 creates the SA. At step 1420, the UE-1 100a maps the IMPU-1 and the MID1. At step 1422, the MCPTT server 300 maps the IMPU-1 and the MID1 and maps the IMPU-2 and the MID2. At step 1424, the UE-2 100c maps the IMPU-2 and the MID2. At step 1426, the UE-1 100a encrypts the MID1 and MID2 identities based on the SA.

At step 1428, the UE-1 100a sends the SIP INVITE message to the signaling plane entity 500. The SIP INVITE message includes the INVITE {MID2}, From: {MID1}, To: {MID2}, IMPU-1 and IC SI. At step 1430, the signaling plane entity 500 sends the SIP INVITE message to the MCPTT service ID hiding entity 1400. At step 1432, the MCPTT service ID hiding entity 1400 fetches the SA from the MCPTT server 300. At step 1434, the MCPTT service ID hiding entity 1400 establishes the SA.

At step 1436, the MCPTT service ID hiding entity 1400 identifies the SA corresponding to the UE1 100a using the IMPU-1. Using the identified SA, the MID1 and MID2 identities are decrypted. At step 1438, the MCPTT service ID hiding entity 1400 send the SIP INVITE message to the MCPTT server 300.

At step 1440, the MCPTT server 300 identifies the IMPU-2 corresponding to the MID2 using the mapping table. At step 1442, the MCPTT server 300 send the SIP INVITE message to the signaling plane entity 500. At step 1444, the MCPTT service ID hiding entity 1400 identifies the SA corresponding to the UE-2 100b using the IMPU-2. Using the identified SA, the MID1 and MID2 identities are encrypted.

At step 1446, the MCPTT service ID hiding entity 1400 sends the SIP INVITE message to the signaling plane entity 500. The SIP INVITE message includes the INVITE {MID2}, From: {MID1}, To: {MID2}, and IMPU-2. At step 1448, the signaling plane entity 500 sends the SIP INVITE message to the UE-2 100b. At step 1450, the UE-2 100b decrypts the MID1 and MID2 identities based on the SA corresponding to the UE-2 100b and the MCPTT server 300.

In an embodiment, a logical entity (e.g. ID hiding entity) in the MCPTT service provider domain and the MCPTT application in the UE 100 performs ID hiding. The logical entity might be a gateway in the MCPTT service provider domain or it might be a centralized gateway to all MCPTT service provider domains. The ID hiding entity obtains the security association from the MCPTT server 300 by using the push model or using the pull model (or on-demand).

Figure 14A:
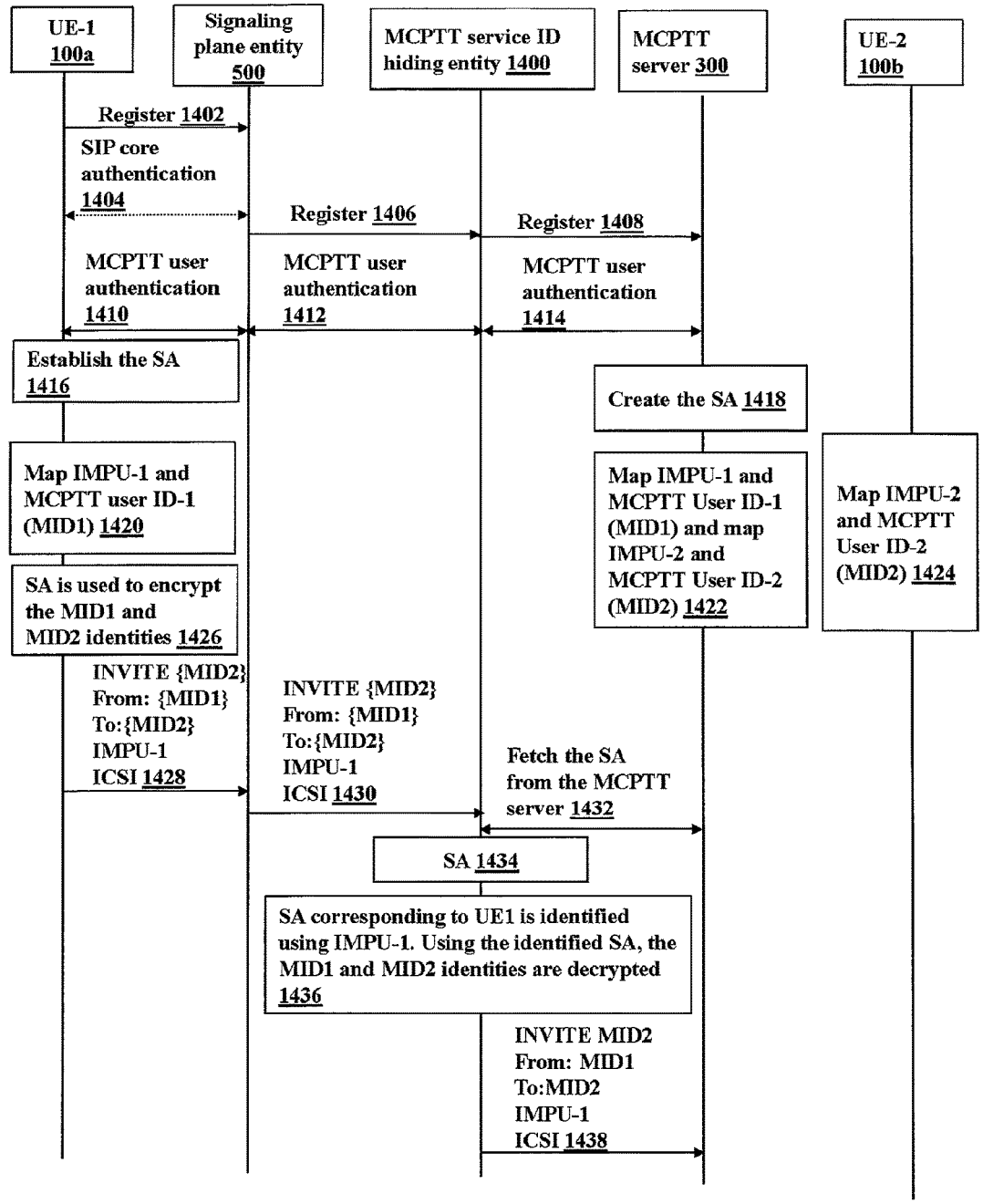
FIGS. 14A to 16B are sequence diagrams illustrating signaling messages for identity hiding using an identification (ID) hiding entity, according to embodiments as disclosed herein.
Figure 14B:
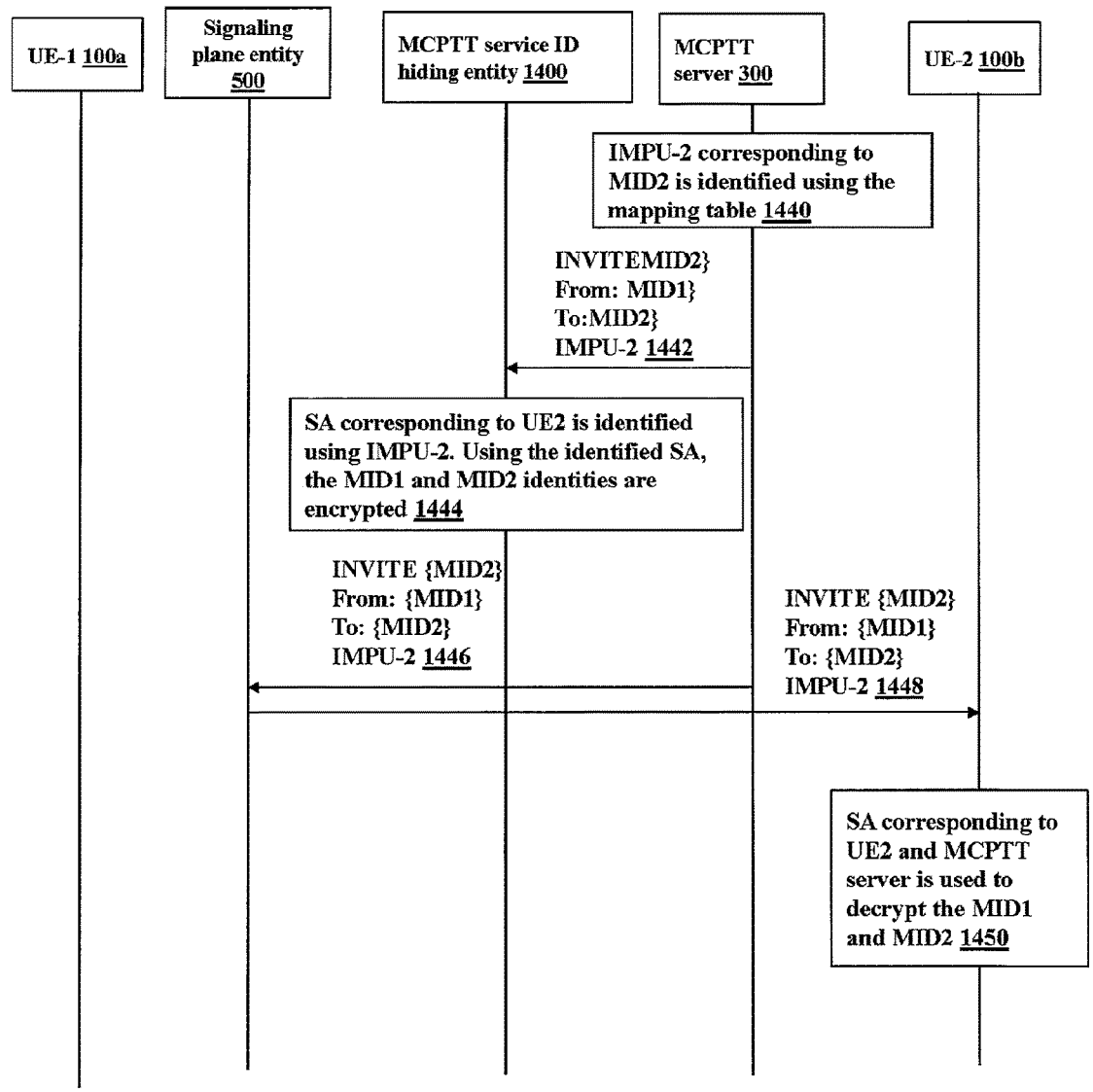

As shown in the FIGS. 14A and 14B illustrate the pull model, where the MCPTT service ID hiding entity 1400 fetches the SA corresponding to the UE-1 100, once the MCPTT service ID hiding entity 1400 receives the non-registration message. In another embodiment, the MCPTT server 300 pushes the SA corresponding to the UE 100 to the ID hiding entity 1400, once it is successfully established during the authentication phase.

In another embodiment, the MCPTT server 300 initiates the authentication procedure with the UE 100 based on the request from the ID hiding entity 1400 for the SA corresponding to the UE 100.

In an embodiment, the method for complete hiding of MCPTT ID is provided using a dummy ID or a temporary ID. Considers either the register message or the non-register message from the UE 100 (before creation of the security association between the UE 100 and the MCPTT server 300) which may expose the MCPTT user ID (caller and/or callee's MCPTT user ID or/and group ID) to the signaling plane entity 500. While after creation of the SA between the UE 100 and the MCPTT service provider domain, all the SIP messages encrypt the MCPTT identities.

In an embodiment, the MCPTT User ID of the caller is never exposed to the signaling plane entity 500 through the use of dummy identity (or temporary ID or Mapping ID). In addition, the dummy ID is also used when the encryption is not possible between the UE 100 and the MCPTT service provider domain or creating the SA, or creating the mapping of IMPU and MCPTT User ID. The dummy ID is unique in the MCPTT Service Provider Domain and identifies the user. The dummy ID is used by the MCPTT server 300 to retrieve the MCPTT User ID and the User authentication security credentials. By using the Dummy ID, the server retrieves the MCPTT user authentication security credentials and performs MCPTT user authentication. After MCPTT user authentication and security association establishment, the Caller UE uses the established SA to encrypt the MCPTT user identities and includes the encrypted MCPTT identities in the SIP messages towards the MCPTT service provider domain.

Figure 15A:
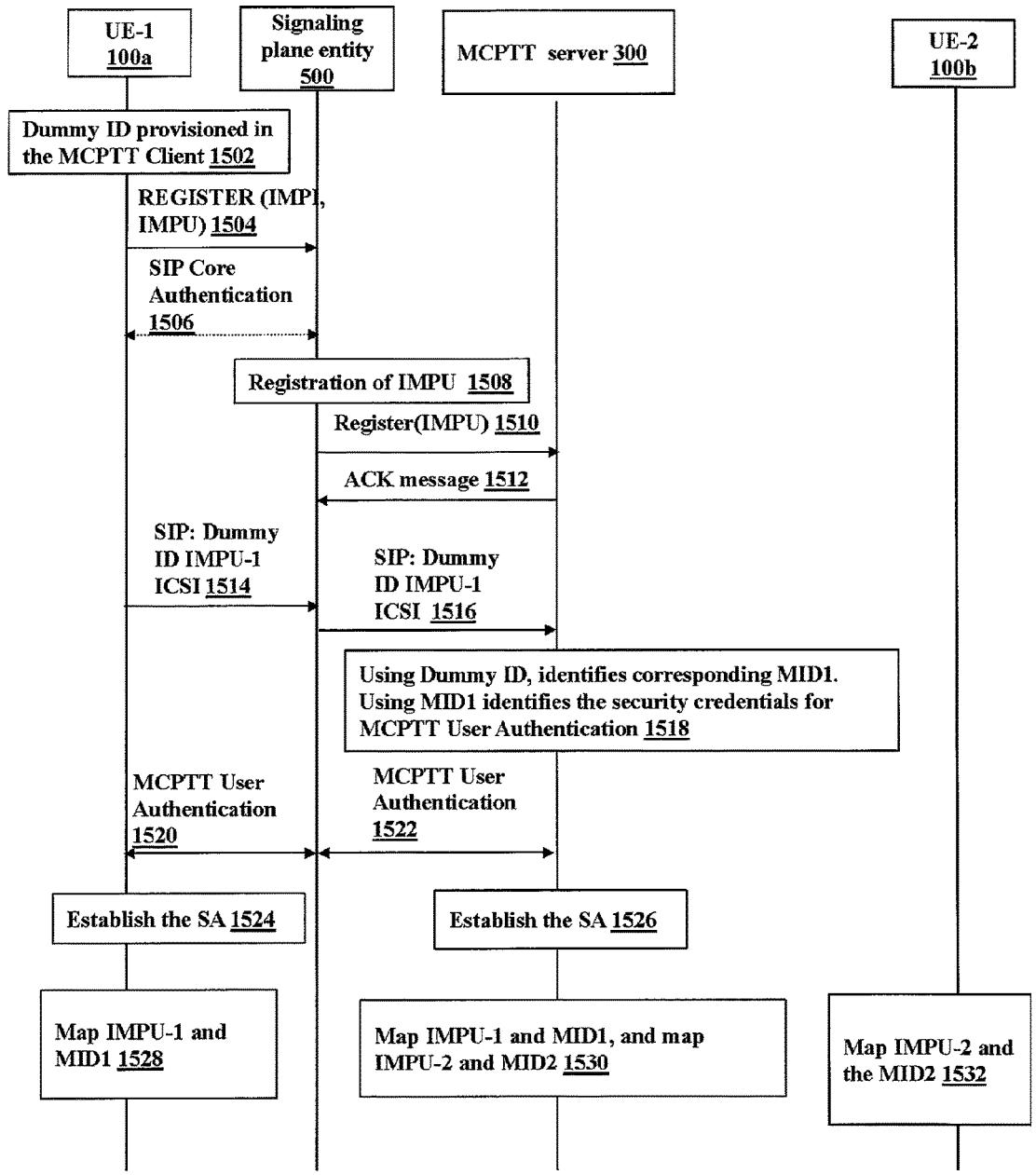
Figure 15B:
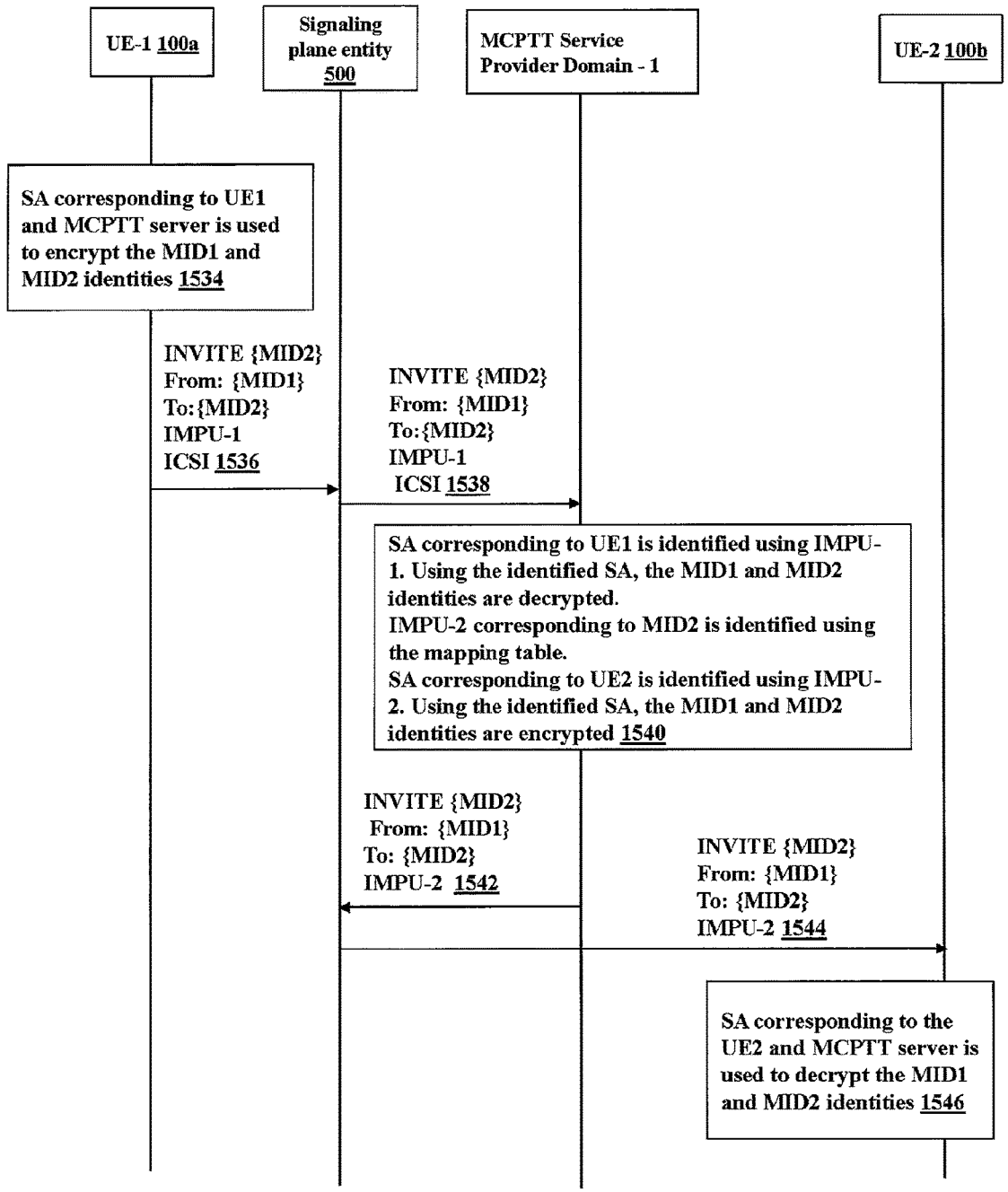

As shown in the FIGS. 15A and 15B, at step 1502, the dummy ID is provisioned in the MCPTT client 102. At step 1504, the UE-100a registers with the signaling plane entity 500. After the registration process, at step 1506, the SIP core authentication procedure is performed between the UE-1 100a and the signaling plane entity 500. At step 1508, the signaling plane entity 500 itself registers the IMPU.

At step 1510, the signaling plane entity 500 registers the IMPU with the MCPTT server 300. At step 1512, the MCPTT server 300 send the acknowledgement message to the signaling plane entity 500. At step 1514, the UE-1 100*a* send the SIP message to the signaling plane entity 500. The SIP message includes dummy ID, IMPU-1 and ICSI. At step 1516, the signaling plane entity 500 send the SIP message to the MCPTT server 300. At step 1518, the MCPTT server 300 identifies corresponding MID1 using the Dummy ID. Based on the identified MID1, the MCPTT server 300 identifies the security credentials for MCPTT user authentication. At step 1520, the MCPTT user authentication procedure is performed between the UE-1 100*a* and the signaling plane entity 500.

At step 1522, the MCPTT user authentication procedure is performed between the signaling plane entity 500 and the MCPTT server 300. At step 1524, the UE-1 100*a* establishes the SA. At step 1526, the MCPTT server 300 establishes the SA. At step 1528, the UE-1 100*a* maps the IMPU-1 and the MID1. At step 1530, the MCPTT server 300 maps the IMPU-1 and the MID1 and maps the IMPU-2 and the MID2. At step 1532, the UE-2 100*c* maps the IMPU-2 and the MID2.

At step 1534, the UE-1 100*a* encrypts the MID1 and MID2 identities based on the SA. At step 1536, the UE-1 100*a* sends the SIP INVITE message to the signaling plane entity 500. The SIP INVITE message includes the INVITE {MID2}, From: {MID1}, To: {MID2}, IMPU-1 and ICSI. At step 1538, the signaling plane entity 500 sends the SIP INVITE message to the MCPTT server 300.

At step 1540, the MCPTT server 300 identifies the SA corresponding to the UE1 100*a* using the IMPU-1. Using the identified SA, the MID1 and MID2 identities are decrypted. Further, the MCPTT server 300 identifies the IMPU-2 corresponding to the MID2 using the mapping table. Further, the MCPTT server 300 identifies the SA corresponding to the UE-2 100*b* using the IMPU-2. Using the identified SA, the MID1 and MID2 identities are encrypted.

At step 1542, the MCPTT server 300 sends the SIP INVITE message to the signaling plane entity 500. The SIP INVITE message includes the INVITE {MID2}, From: {MID1}, To: {MID2}, and IMPU-2. At step 1544, the signaling plane entity 500 sends the SIP INVITE message to the UE-2 100*b*. At step 1546, the UE-2 100*b* decrypts the MID1 and MID2 identities based on the SA corresponding to the UE-2 100*b* and the MCPTT server 300.

In an embodiment, the IMPI may play the role of dummy ID.

In an embodiment, method for complete hiding of the MCPTT ID is provided using the SIP message which does not contains MCPTT user IDs (i.e. the dummy message). After successful IMPU registration, the UE 100 initiates the (dummy) SIP message. The SIP message contains only the IMPU and does not contain any MCPTT User IDs. The (dummy) SIP message which contains only the IMPU is used to trigger MCPTT User authentication and creation of security association. The MCPTT user ID is not exposed to the SIP core and this alternative considers the availability of the mapping between the IMPU and the MCPTT User ID in the MCPTT service provider domain, before SA establishment. Once the MCPTT server 300 knows the IMPU, the MCPTT server 300 retrieves the MCPTT user ID and the associated user security credentials for the MCPTT user authentication. After successful MCPTT user authentication, the SA is created to hide MCPTT user identities. This alternative approach is applicable when the mapping between the IMPU and the MCPTT user identity is provided by the entity like identity management server (e.g., TNA based authentication procedures) before the MCPTT user authentication.

Figure 16A:
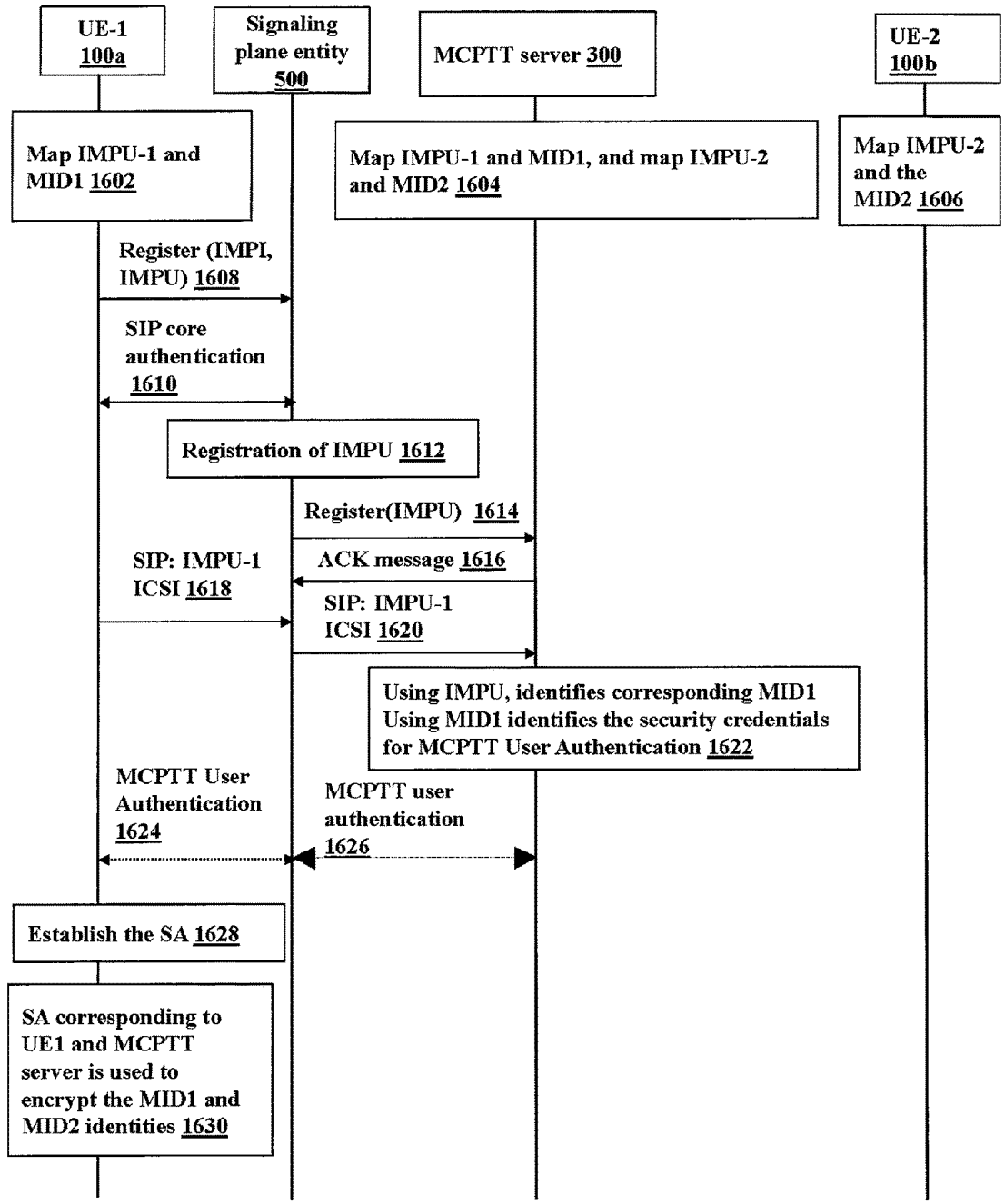
Figure 16B:
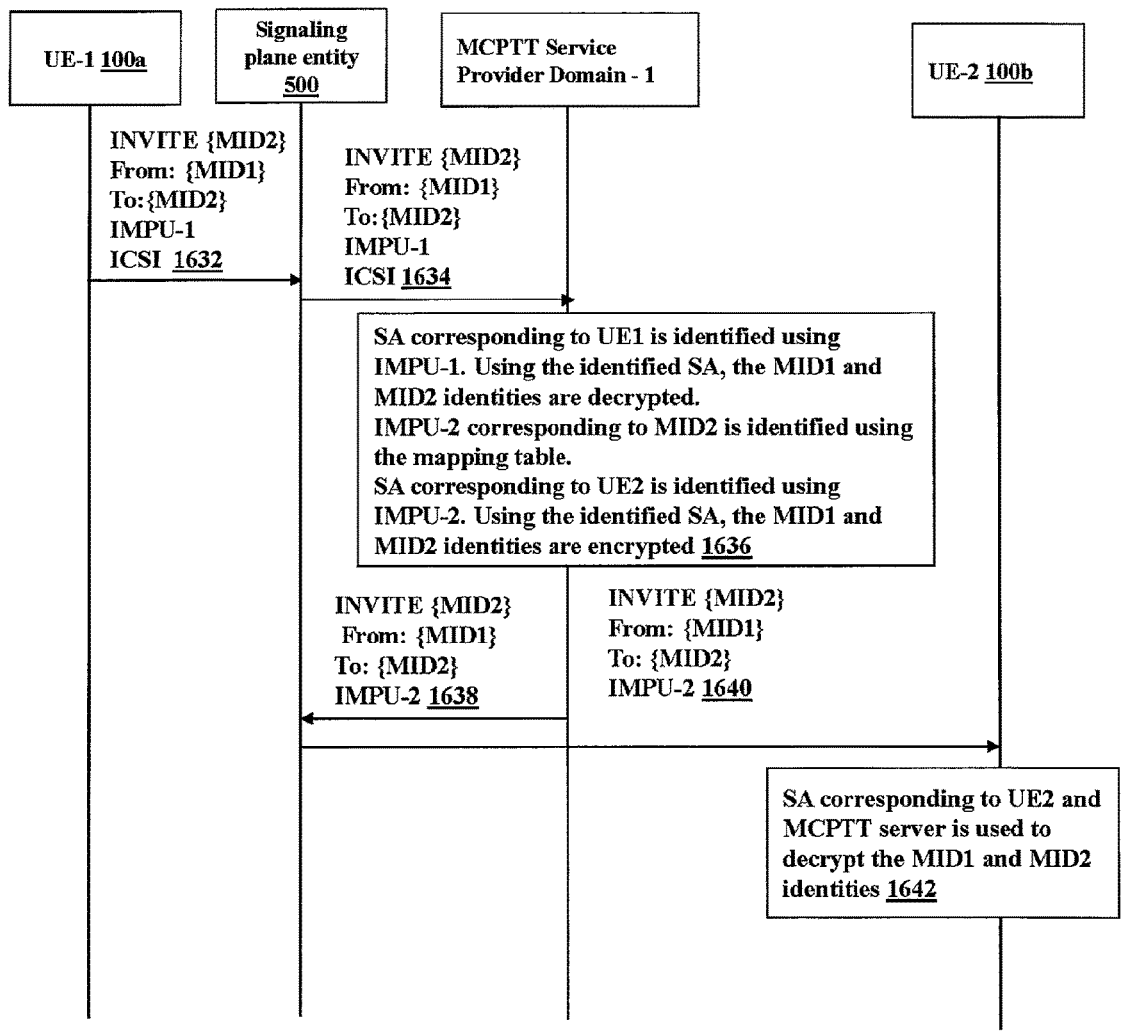

As shown in the FIGS. 16A and 16B, at step 1602, the UE-1 100*a* maps the IMPU-1 and the MID1. At step 1604, the MCPTT server 300 maps the IMPU-1 and the MID1 and maps the IMPU-2 and the MID2. At step 1606, the UE-2 100*c* maps the IMPU-2 and the MID2. At step 1608, the UE-100*a* registers with the signaling plane entity 500. The registration message includes the IMPI and the IMPU. At step 1610, the SIP core authentication procedure is performed between the UE-1 100*a* and the signaling plane entity 500.

At step 1612, the signaling plane entity 500 itself registers the IMPU. At step 1614, the signaling plane entity 500 registers the IMPU with the MCPTT server 300. At step 1616, the MCPTT server 300 send the acknowledgement message to the signaling plane entity 500. At step 1618, the UE-1 100*a* send the SIP message to the signaling plane entity 500. The SIP message includes the IMPU-1 and ICSI. At step 1620, the signaling plane entity 500 send the SIP message to the MCPTT server 300.

At step 1622, the MCPTT server 300 identifies the corresponding MID1 using the IMPU. Further, the MCPTT server 300 identifies the security credentials for the MCPTT user authentication based on the MID1.

At step 1624, the MCPTT user authentication procedure is performed between the UE-1 100*a* and the signaling plane entity 500. At step 1626, the MCPTT user authentication procedure is performed between the signaling plane entity 500 and the MCPTT server 300. At step 1628, the UE-1 100*a* establishes the SA.

At step 1630, the MCPTT server 300 encrypts the MID1 and MID2 identities based on the SA. At step 1632, the UE-1 100*a* sends the SIP INVITE message to the signaling plane entity 500. The SIP INVITE message includes the INVITE {MID2}, From: {MID1}, To: {MID2}, IMPU-1 and ICSI. At step 1634, the signaling plane entity 500 sends the SIP INVITE message to the MCPTT server 300.

At step 1636, the MCPTT server 300 identifies the SA corresponding to the UE1 100*a* using the IMPU-1. Using the identified SA, the MID1 and MID2 identities are decrypted. Further, the MCPTT server 300 identifies the IMPU-2 corresponding to the MID2 using the mapping table. Further, the MCPTT server 300 identifies the SA corresponding to the UE-2 100*b* using the IMPU-2. Using the identified SA, the MID1 and MID2 identities are encrypted.

At step 1638, the MCPTT server 300 sends the SIP INVITE message to the signaling plane entity 500. The SIP INVITE message includes the INVITE {MID2}, From: {MID1}, To: {MID2}, and IMPU-2. At step 1640, the signaling plane entity 500 sends the SIP INVITE message to the UE-2 100*b*. At step 1642, the UE-2 100*b* decrypts the MID1 and MID2 identities based on the SA corresponding to the UE-2 100*b* and the MCPTT server 300.

In an embodiment, the method for complete hiding of the MCPTT ID may be provided using a pre-configured security association between the UE 100 and the MCPTT service provider domain 400 and indexing it with the signaling plane identity. After successful IMPU registration, the UE 100 and the MCPTT service provider domain index the registered IMPU(s) to the pre-configured security association, so that the MCPTT user identities included in the initial message from the UE 100 to the MCPTT Service Provider Domain are encrypted.

Figure 17:
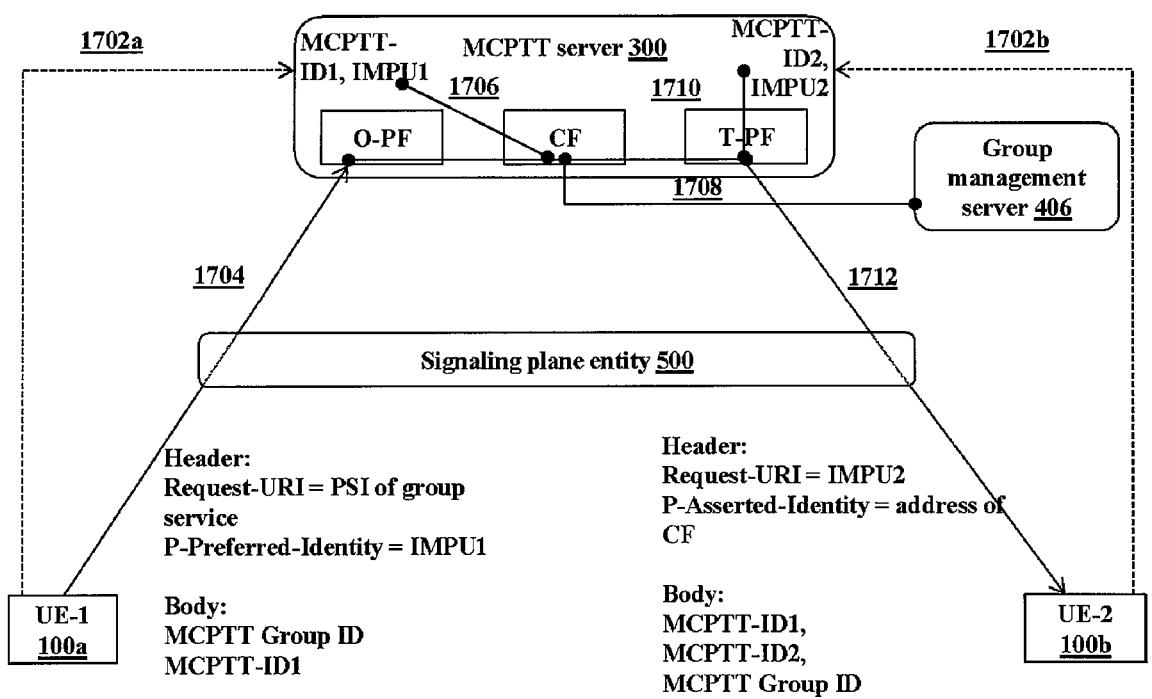
FIG. 17 illustrates contents of SIP headers and SIP bodies inserted by MCPTT clients and MCPTT servers involved in a group call, according to embodiments as disclosed herein.

FIG. 17 illustrates a contents of SIP headers and SIP bodies inserted by MCPTT client's 100*a*-100*c* and the MCPTT server 300 involved in the group call, according to the embodiments as disclosed herein. The MCPTT server 300 includes an O-PF functional entity, a CF functional entity, and a T-PF functional entity. At steps 1702a and 1702b, the UE-1 100a or the UE-2 100b sends the group call session initiation request to the MCPTT server 300. At step 1704, the UE-1 100a sends the request-URI containing the group identity to the O-PF functional entity. At step 1706, the CF functional entity receives the information including the group identity and the MCPTT ID of the originating user. At step 1708, the CF functional entity sends the information including the group identity and the MCPTT ID of the originating user to the group management server 406. At step 1710, the T-PF functional entity receives the information including the MCPTT ID of the terminating user, the MCPTT ID of the originating user, and the group identity. At step 1710, the T-PF functional entity sends information including the MCPTT ID of the terminating user, the MCPTT ID of originating user and the group identity to the UE-2 100b.

The operations and the functionalities of the O-PF functional entity, the CF functional entity, and the T-PF functional entity are explained in the Table 2. Further, the operations and the functionalities of the O-PF functional entity, the CF functional entity, and the T-PF functional entity included in the MCPTT server 300 are similar to the FIG. 11.

The Table 2 illustrates the contents of the SIP headers and SIP bodies inserted by the UE-1 100a, UE-2 100b and MCPTT server 300 involved in the group call.

TABLE 2

| Interface | Content of SIP headers | Content of SIP bodies (body in brackets) | Notes |
|---|---|---|---|
| Originating MCPTT client to originating participating MCPTT function (O-PF). | Request-URI contains PSI of O-PF. P-Preferred-Identity may contain IMPU of originating user. | "mcptt-request-uri" contains the group identity. | PSI of O-PF configured for each client. MCPTT-id of each client is never sent in session initiation. |
| O-PF to controlling MCPTT function (CF). | Request-URI contains PSI of CF. P-Asserted-Identity contains IMPU of originating user. | "mcptt-request-uri" contains the group identity. "mcptt-calling-user-id" contains MCPTT ID of originating user. | CF finds the MCPTT ID of the originating user from the stored IMPU-MCPTT ID binding and locates the PSI of the controller that serves the group identity. O-PF contains configuration of the PSIs of the CFs. |
| CF to terminating participating MCPTT function (T-PF). | Request-URI contains the address of the T-PF. P-Asserted-Identity contains the address of the CF. | mcptt-request-uri" contains the MCPTT ID of the terminating user. "mcptt-calling-user-id" contains" MCPTT ID of originating user. "mcptt-group-id" contains the group identity. | For each client in the group, CF maps the MCPTT-ID of the terminator to the address of the T-PF. If the terminator is in another domain, the CF can map the MCPTT ID of the terminator to a PSI identifying an interrogating function in the partner network that is able to find the T-PF using the MCPTT ID. |
| CF to non-controlling MCPTT function of an MCPTT group (NCF). | Request-URI contains the PSI of the NCF. P-Asserted-Identity contains the PSI of the CF. | "mcptt-request-uri" contains the group identity. "mcptt-calling-user-id" contains MCPTT ID of originating user. | |
| T-PF to terminating MCPTT client. | Request-URI contains the IMPU of the terminating user. P-Asserted-Identity contains the address of the CF. | "mcptt-request-uri" contains the MCPTT ID of the terminating user. "mcptt-calling-user-id" contains MCPTT ID of originating user. "mcptt-group-id" contains the group identity. | T-PF finds the IMPU of the terminating user from the stored IMPU-MCPTT ID binding at the time of registration. |

TABLE 2-continued

| Interface | Content of SIP headers | Content of SIP bodies (body in brackets) | Notes |
|---|---|---|---|
| terminating MCPTT client to T-PF (response). | as in TS 24.229. | "mcptt-called-party-id" contains contacted client's MCPTT ID. | invited user may have forwarded communications to another client. |
| T-PF to CF (response). | as in TS 24.229. | "mcptt-called-user" contains contacted client's MCPTT ID. | invited user may have forwarded communications to another client. |
| NCF to CF (response) | as in TS 24.229. | — | In the case of trusted mutual aid, the NCF returns the identities of the group in a "resources-list" MIME body. |
| CF to O-PF (response) | as in TS 24.229. | "mcptt-called-party-id" contains contacted client's MCPTT ID | — |
| O-PF to originating MCTT client (response) | as in TS 24.229. | "mcptt-called-party-id" contains contacted client's MCPTT ID. | — |

Figure 18:
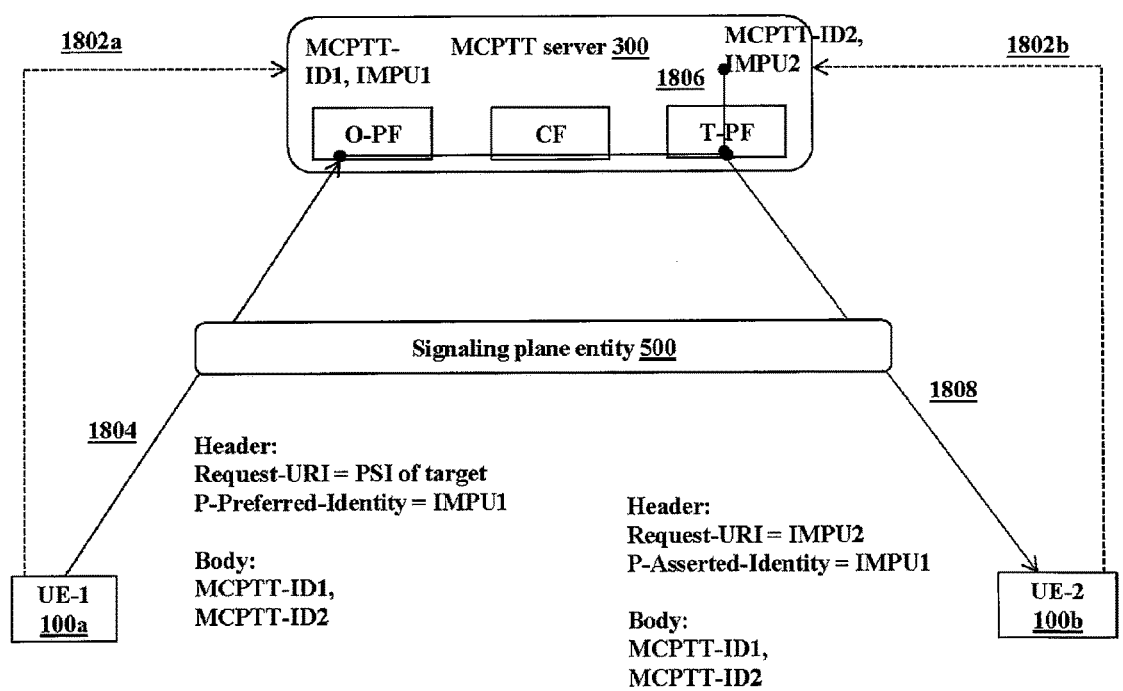
FIG. 18 illustrates contents of SIP headers and SIP bodies inserted by MCPTT clients and MCPTT servers involved in a private call, according to embodiments as disclosed herein.

FIG. 18 illustrates contents of the SIP headers and SIP bodies inserted by the MCPTT clients and the MCPTT servers 300 involved in the private call, according to the embodiments as disclosed herein. The Table 3 illustrates the contents of the SIP headers and SIP bodies inserted by the UE-1 100a, the UE-2 100b, and the MCPTT server 300 involved in the private call.

The MCPTT server 300 includes the O-PF functional entity, the CF functional entity, and the T-PF functional entity. At steps 1802a and 1802b, the UE-1 100a or the UE-2 100b sends the private call session initiation request to the MCPTT server 300. At step 1804, the UE-1 100a sends the request-URI containing the MCPTT ID of the called user to the O-PF functional entity. At step 1806, the CF functional entity receives the information including MCPTT ID of the called user and the MCPTT ID of the calling user and the T-PF functional entity receives the information including the MCPTT ID of the calling user and the MCPTT ID of the called user. At step 1808, the T-PF functional entity sends information including the MCPTT ID of the calling user and the MCPTT ID of the called user to the UE-2 100b.

Further, the operations and the functionalities of the O-PF functional entity, the CF functional entity, and the T-PF functional entity are explained in the Table 3. Further, the operations and the functionalities of the O-PF functional entity, the CF functional entity, and the T-PF functional entity included in the MCPTT server 300 are similar to the FIG. 9.

TABLE 3

| Interface | Content of SIP headers | Content of SIP bodies (body in brackets) | Notes |
|---|---|---|---|
| originating MCPTT client to originating participating MCPTT function (O-PF) | Request-URI contains the PSI for the private call service. P-Preferred-Identity may contain IMPU of originating user | MCPTT ID of called user (resources-list) "mcptt-calling-user-id" (mcptt-info) | PSI for private call is configured on the client. |
| O-PF to controlling MCPTT function (CF) | Request-URI contains the PSI for the private call service. P-Asserted-Identity contains IMPU of originating user. | MCPTT ID of called user (resources-list) MCPTT ID of calling user contained in "mcptt-calling-user-id" (mcptt-info) | — |
| CF to terminating participating MCPTT function (T-PF) | Request-URI contains the address of the T-PF. P-Asserted-Identity contains IMPU of originating user. | MCPTT ID of calling user contained in "mcptt-calling-user-id" (mcptt-info). MCPTT ID of called user contained in "mcptt-called-party-id" (mcptt-info). | If the terminator is in another domain, the CF can map the MCPTT ID of the terminator to a PSI identifying an interrogating function in the partner network that is able to find the T-PF using the MCPTT ID. |
| T-PF to terminating MCPTT client | Request-URI contains the IMPU of the terminating user. P-Asserted-Identity contains | MCPTT ID of calling user contained in "mcptt-calling-user-id" (mcptt-info). | — |

TABLE 3-continued

| Interface | Content of SIP headers | Content of SIP bodies (body in brackets) | Notes |
|---|---|---|---|
| | IMPU of originating user. | MCPTT ID of called user contained in "mcptt-called-party-id" (mcptt-info). | |
| terminating MCPTT client to T-PF (response) | as in TS 24.229 | "mcptt-called-party-id" contains contacted client's MCPTT ID. | invited user may have forwarded communications to another client. |
| T-PF to CF (response) | as in TS 24.229 | "mcptt-called-user" contains contacted client's MCPTT ID. | invited user may have forwarded communications to another client. |
| CF to O-PF (response) | as in TS 24.229 | "mcptt-called-party-id" contains contacted client's MCPTT ID. | — |
| O-PF to originating MCTT client (response) | as in TS 24.229 | "mcptt-called-party-id" contains contacted client's MCPTT ID. | — |

Figure 19:
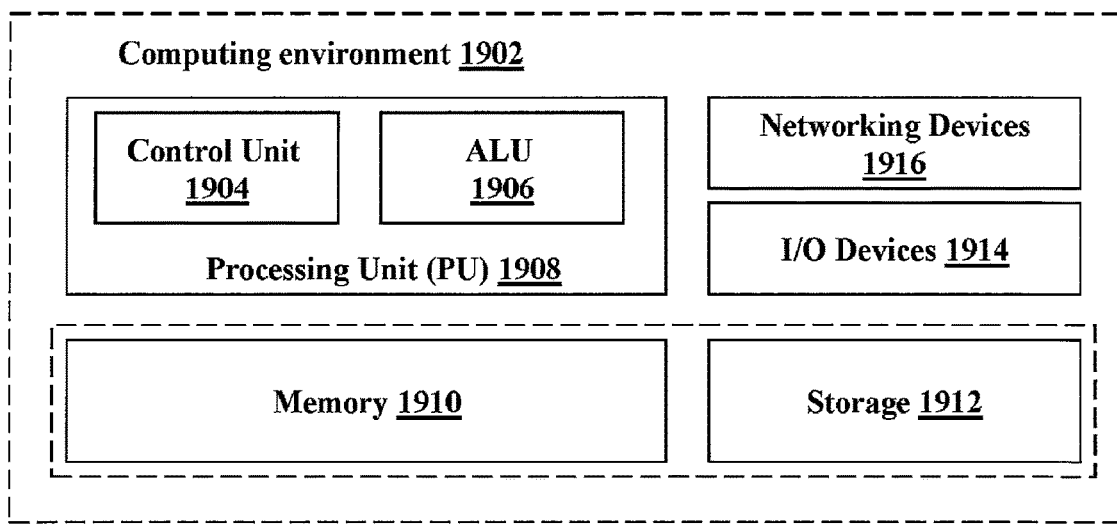
FIG. 19 illustrates a computing environment implementing a mechanism for identity management across multiple planes, according to embodiments as disclosed herein.

FIG. 19 illustrates a computing environment 1902 implementing a mechanism for identity management across multiple planes, according to the embodiments as disclosed herein. As depicted in the FIG. 19, the computing environment 1902 comprises at least one processing unit 1908 that is equipped with a control unit 1904, an Arithmetic Logic Unit (ALU) 1906, a memory 1910, a storage unit 1912, a plurality of networking devices 1916 and a plurality Input output (I/O) devices 1914. The processing unit 1908 is responsible for processing the instructions of the technique. The processing unit 1908 receives commands from the control unit 1904 in order to perform its processing. Further, any logical and arithmetic operations involved in the execution of the instructions are computed with the help of the ALU 1906.

The overall computing environment 1902 can be composed of multiple homogeneous or heterogeneous cores, multiple CPUs of different kinds, special media and other accelerators. The processing unit 1908 is responsible for processing the instructions of the technique. Further, the plurality of processing units 1904 may be located on a single chip or over multiple chips.

The technique comprising of instructions and codes required for the implementation are stored in either the memory unit 1910 or the storage 1912 or both. At the time of execution, the instructions may be fetched from the corresponding memory 1910 or storage 1912, and executed by the processing unit 1908.

In case of any hardware implementations various networking devices 1916 or external I/O devices 1914 may be connected to the computing environment 1902 to support the implementation through the networking unit and the I/O device unit.

The embodiments disclosed herein can be implemented through at least one software program running on at least one hardware device and performing network management functions to control the elements. The elements shown in the FIGS. 1 to 19 include blocks which can be at least one of a hardware device, or a combination of hardware device and software module.

Although exemplary embodiments of the present disclosure have been described in detail hereinabove, it should be understood that many variations and modifications of the basic inventive concept herein described, which may be apparent to those skilled in the art, will still fall within the spirit and scope of the exemplary embodiments of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for identity management across multiple planes, the method comprising:
   receiving, by a mission critical push to talk (MCPTT) server, a first request message to establish a call between a first MCPTT client and at least one second MCPTT client from a signaling plane entity, wherein the first request message comprises an application plane identity of the first MCPTT client and an application plane identity of the at least one second MCPTT client;
   translating, at the MCPTT server, the application plane identity of the at least one second MCPTT client to a signaling plane identity of the at least one second MCPTT client; and
   sending, by the MCPTT server, at least one second request message comprising the signaling plane identity of the at least one second MCPTT client to the at least one second MCPTT client to establish the call via the signaling plane entity.

2. The method of claim 1, wherein translating the application plane identity of the at least one second MCPTT client to the signaling plane identity of the at least one second MCPTT client comprising:
   retrieving a MCPTT client identity for each of the at least one second MCPTT client associated with the application plane identity;
   identifying the signaling plane identity corresponding to each of the MCPTT identity from an identity management entity; and
   translating the application plane identity to the signaling plane identity for each of the at least one second MCPTT client.

3. The method of claim 1, wherein the signaling plane identity of the at least one second MCPTT client is predefined and is stored in an identity management entity during service registration,
   wherein the identity management entity is stored at one of the MCPTT server, a group management server, and a signaling plane domain entity.

4. The method of claim 1, wherein the application plane identity is one of a MCPTT client identity and a MCPTTT group identity, wherein the signaling plane identity is at least one of a public user identity, an IP multimedia public identity (IMPU), a tel uniform resource identifier (tel URI), and a mobile subscriber integrated services digital network (MSISDN) identity,
   wherein the signaling plane entity is one of a session initiation protocol (SIP) core signaling plane entity, internet protocol (IP) multimedia subsystem (IMS) core signaling plane entity, and a home subscriber server (HSS) entity.

5. The method of claim 1, wherein the application plane identity of the first MCPTT client and the application plane identity of the at least one second MCPTT client in the first request message is encrypted by the first MCPTT client, wherein the application plane identity of the at least one second MCPTT client in the at least one second request message is encrypted by the MCPTT server, wherein the MCPTT server sends the encrypted application plane identities to the first MCPTT client.

6. The method of claim 1, wherein the MCPTT server decrypts the application plane identity of the first MCPTT client and the application plane identity of the at least one second MCPTT client by:
fetching an security key associated with the first MCPTT client; and
decrypting the application plane identity of the first MCPTT client and the application plane identity of the at least one second MCPTT client in the first request message based on the security key.

7. A method for identity management across multiple planes, the method comprising:
receiving, by a signaling plane entity, a first request message from a first mission critical push to talk (MCPTT) client to establish a call with at least one second MCPTT client, wherein the first request message comprises an application plane identity of the first MCPTT client and an application plane identity of the at least one second MCPTT client;
sending, by the signaling plane entity, the first request message to an MCPTT server; and
receiving, by the signaling plane entity, at least one second request message from the MCPTT server to establish the call to the at least one second MCPTT client, wherein the at least one second request message comprises at least one signaling plane identity of the at least one second MCPTT client.

8. The method of claim 7, wherein the signaling plane identity of the at least one second MCPTT client is predefined and is stored in an identity management entity during service registration,
wherein the identity management entity is stored at one of the MCPTT server, a group management server, and a signaling plane domain entity.

9. The method of claim 7, wherein the application plane identity is one of a MCPTT client identity and a MCPTTT group identity, wherein the signaling plane identity is at least one of a public user identity, an IP multimedia public identity (IMPU), a tel uniform resource identifier (tel URI), and a mobile subscriber integrated services digital network (MSISDN) identity,
wherein the signaling plane entity is one of a session initiation protocol (SIP) core signaling plane entity, internet protocol (IP) multimedia subsystem (IMS) core signaling plane entity, and a home subscriber server (HSS) entity.

10. The method of claim 7, wherein the application plane identity of the first MCPTT client and the application plane identity of the at least one second MCPTT client in the first request message is encrypted by the first MCPTT client,
wherein the application plane identity of the at least one second MCPTT client in the at least one second request message is encrypted by the MCPTT server, wherein the MCPTT server sends the encrypted application plane identities to the first MCPTT client.

11. A mission critical push to talk (MCPTT) server for identity management across multiple planes, comprising:
a memory unit; and
a processor unit coupled to the memory unit, where the processor unit is configured to:
receive a first request message to establish a call between a first MCPTT client and at least one second MCPTT client from a signaling plane entity, wherein the first request message comprises an application plane identity of the first MCPTT client and an application plane identity of the at least one second MCPTT client;
translate the application plane identity of the at least one second MCPTT client to a signaling plane identity of the at least one second MCPTT client; and
send at least one second request message comprising the signaling plane identity of the at least one second MCPTT client to the at least one second MCPTT client to establish the call via the signaling plane entity.

12. The MCPTT server of claim 11, wherein translate the application plane identity of the at least one second MCPTT client to the signaling plane identity of the at least one second MCPTT client comprising:
retrieving a MCPTT client identity for each of the at least one second MCPTT client associated with the application plane identity;
identifying the signaling plane identity corresponding to each of the MCPTT identity from an identity management entity; and
translating the application plane identity to the signaling plane identity for each of the at least one second MCPTT client.

13. The MCPTT server of claim 11, wherein the signaling plane identity of the at least one second MCPTT client is predefined and is stored in an identity management entity during service registration,
wherein the identity management entity is stored at one of the MCPTT server, a group management server, and a signaling plane domain entity.

14. The MCPTT server of claim 11, wherein the application plane identity is one of a MCPTT client identity and a MCPTTT group identity, wherein the signaling plane identity is at least one of a public user identity, an IP multimedia public identity (IMPU), a tel uniform resource identifier (tel URI), and a mobile subscriber integrated services digital network (MSISDN) identity,
wherein the signaling plane entity is one of a session initiation protocol (SIP) core signaling plane entity, internet protocol (IP) multimedia subsystem (IMS) core signaling plane entity, and a home subscriber server (HSS) entity.

15. The MCPTT server of claim 11, wherein the application plane identity of the first MCPTT client and the application plane identity of the at least one second MCPTT client in the first request message is encrypted by the first MCPTT client,
wherein the application plane identity of the at least one second MCPTT client in the at least one second request message is encrypted by the MCPTT server, wherein the MCPTT server sends the encrypted application plane identities to the first MCPTT client.

16. The MCPTT server of claim 11, wherein the MCPTT server decrypts the application plane identity of the first MCPTT client and the application plane identity of the at least one second MCPTT client by:
fetching an security key associated with the first MCPTT client; and
decrypting the application plane identity of the first MCPTT client and the application plane identity of the at least one second MCPTT client in the first request message based on the security key.

17. The signaling plane entity of claim 11, wherein the application plane identity of the first MCPTT client and the application plane identity of the at least one second MCPTT client in the first request message is encrypted by the first MCPTT client,
  wherein the application plane identity of the at least one second MCPTT client in the at least one second request message is encrypted by the MCPTT server, wherein the MCPTT server sends the encrypted application plane identities to the first MCPTT client.

18. A signaling plane entity for identity management across multiple planes, comprising:
  a memory unit; and
  a processor unit coupled to the memory unit, where the processor unit is configured to:
  receive a first request message from a first mission critical push to talk (MCPTT) client to establish a call with at least one second MCPTT client, wherein the first request message comprises an application plane identity of the first MCPTT client and an application plane identity of the at least one second MCPTT client;
  send the first request message to an MCPTT server;
  receive at least one second request message from the MCPTT server comprising at least one signaling plane identity of the at least one second MCPTT client; and
  establish the call with the at least one second MCPTT client based on the signaling plane identity.

19. The signaling plane entity of claim 18, wherein the signaling plane identity of the at least one second MCPTT client is predefined and is stored in an identity management entity during service registration,
  wherein the identity management entity is stored at one of the MCPTT server, a group management server, and a signaling plane domain entity.

20. The signaling plane entity of claim 18, wherein the application plane identity is one of a MCPTT client identity and a MCPTTT group identity, wherein the signaling plane identity is at least one of a public user identity, an IP multimedia public identity (IMPU), a tel uniform resource identifier (tel URI), and a mobile subscriber integrated services digital network (MSISDN) identity,
  wherein the signaling plane entity is one of a session initiation protocol (SIP) core signaling plane entity, internet protocol (IP) multimedia subsystem (IMS) core signaling plane entity, and a home subscriber server (HSS) entity.

\* \* \* \* \*